(12) United States Patent
Raghavan et al.

(10) Patent No.: US 12,199,922 B2
(45) Date of Patent: *Jan. 14, 2025

(54) CHANNEL QUALITY INDICATOR REPORTING ACROSS MULTIPLE SUBBANDS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,330

(22) Filed: Apr. 11, 2023

(65) Prior Publication Data

US 2023/0246789 A1     Aug. 3, 2023

Related U.S. Application Data

(63) Continuation of application No. 17/382,828, filed on Jul. 22, 2021, now Pat. No. 11,677,531.

(51) Int. Cl.
*H04L 5/00* (2006.01)
(52) U.S. Cl.
CPC ............ *H04L 5/006* (2013.01); *H04L 5/0046* (2013.01); *H04L 5/0094* (2013.01)

(58) Field of Classification Search
CPC ... H04L 1/0026; H04L 1/0029; H04L 1/1621; H04L 5/0046; H04L 5/006; H04L 5/0094; H04W 28/06

See application file for complete search history.

(56) References Cited

U.S. PATENT DOCUMENTS

| | | | |
|---|---|---|---|
| 10,735,073 B2 | 8/2020 | Kim et al. | |
| 2010/0271970 A1* | 10/2010 | Pan | H04L 1/0029 370/252 |
| 2011/0312332 A1 | 12/2011 | Choudhury et al. | |
| 2012/0044894 A1 | 2/2012 | Ko et al. | |
| 2012/0057499 A1* | 3/2012 | Pedersen | H04L 5/0053 370/252 |
| 2012/0327883 A1 | 12/2012 | Yang et al. | |
| 2015/0146696 A1* | 5/2015 | Golitschek Edler Von Elbwart | H04W 24/10 370/335 |

(Continued)

*Primary Examiner* — Pao Sinkantarakorn
(74) *Attorney, Agent, or Firm* — Holland & Hart LLP/Qualcomm

(57) ABSTRACT

Methods, systems, and devices for wireless communications are described. In some examples, a wireless communications system may support group channel quality indicator (CQI) reporting. For example, a user equipment (UE) may receive, from a base station, signaling indicating a group of component carriers (CCs) and one or more subbands within the group of CCs. The UE may receive one or more reference signals within the one or more subbands and determine a group CQI index corresponding to the group of CCs based at least in part on the one or more reference signals. The UE may then transmit a report to the base station indicating the group CQI index and the base station may determine a CQI index for each of the one or more subbands based on the group CQI index.

24 Claims, 19 Drawing Sheets

(56) References Cited

U.S. PATENT DOCUMENTS

2020/0244392 A1 7/2020 Noh et al.
2023/0022249 A1 1/2023 Raghavan et al.

* cited by examiner

CHANNEL QUALITY INDICATOR REPORTING ACROSS MULTIPLE SUBBANDS

CROSS REFERENCE

The present application for patent is a Continuation of U.S. patent application Ser. No. 17/382,828 by RAGHAVAN et al., entitled "CHANNEL QUALITY INDICATOR REPORTING ACROSS MULTIPLE SUBBANDS" and filed Jul. 22, 2021, which is assigned to the assignee hereof and is expressly incorporated by reference in its entirety herein.

TECHNICAL FIELD

The following relates to wireless communications, including channel quality indicator (CQI) reporting across multiple subbands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a wireless communications system may support channel quality indicator (CQI) reporting. CQI reporting may allow a base station to determine a modulation and coding scheme (MCS) to use when communicating with a UE. The UE may be configured for wideband CQI reporting or subband CQI reporting. When configured for wideband CQI reporting, the UE may report a single CQI index value for a set of subbands. When configured for subband CQI reporting, the UE may report a distinct CQI index value for each subband of the set of subbands.

SUMMARY

The described techniques relate to improved methods, systems, devices, and apparatuses that support channel quality indicator (CQI) reporting across multiple subbands. For example, the described techniques provide for a UE to report a group CQI index value corresponding to a group of component carriers (CCs). The UE may receive control signaling from a base station indicating a group of CCs. The group of CCs may be a subset of set of CCs configured for the UE (e.g., the group of CCs may collectively span a portion of the operating bandwidth for the UE). Additionally, the UE may receive, from the base station, an indication of a set of subbands, where one or more subbands of the set occupies at least one CC of the group of CCs. The UE may measure one or more reference signals over the one or more subbands and determine a group CQI index value for the group of CCs. The UE may then transmit a report including the group CQI index to the base station and the base station may determine a subband CQI index value for each of the one or more subbands based on the group CQI index.

Additionally or alternatively, the wireless communications system may support differential CQI reporting. For example, a base station may transmit control signaling to a UE indicating a reference subband for (e.g., within) a set of subbands. The base station may transmit one or more reference signals over the set of subbands and the UE may determine a respective CQI index value for the reference subband and each other subband of the set of subbands. The UE may then construct a report that includes an indication of the full CQI index value for the reference subband (e.g., a 6-bit indication) and a differential CQI index value (e.g., 2 bit indication) for each of the other subbands. The UE may transmit the report to the base station, and the base station may determine a subband-specific CQI index value for each of the subbands based on the report.

A method for wireless communications at a UE is described. The method may include receiving, from a base station, control signaling indicating a group of CCs and one or more subbands within the group of CCs, where the group of CCs includes a subset of a set of CCs, and where the set of CCs spans a bandwidth and each CC of the set occupies a different frequency range within the bandwidth, receiving, from the base station, one or more reference signals within the one or more subbands within the group of CCs, determining a group CQI index based on the one or more reference signals, where the group CQI index is included in a set of multiple candidate CQI indices, and where the group CQI index corresponds to the group of CCs, and transmitting, to the base station, a report indicating the group CQI index.

An apparatus for wireless communications at a UE is described. The apparatus may include a processor, memory coupled (e.g., operatively, communicatively, functionally, electronically, or electrically) with the processor, and instructions stored in the memory. The instructions may be executable by the processor to cause the apparatus to receive, from a base station, control signaling indicating a group of CCs and one or more subbands within the group of CCs, where the group of CCs includes a subset of a set of CCs, and where the set of CCs spans a bandwidth and each CC of the set occupies a different frequency range within the bandwidth, receive, from the base station, one or more reference signals within the one or more subbands within the group of CCs, determine a group CQI index based on the one or more reference signals, where the group CQI index is included in a set of multiple candidate CQI indices, and where the group CQI index corresponds to the group of CCs, and transmit, to the base station, a report indicating the group CQI index.

Another apparatus for wireless communications at a UE is described. The apparatus may include means for receiving, from a base station, control signaling indicating a group of CCs and one or more subbands within the group of CCs, where the group of CCs includes a subset of a set of CCs, and where the set of CCs spans a bandwidth and each CC of the set occupies a different frequency range within the bandwidth, means for receiving, from the base station, one or more reference signals within the one or more subbands within the group of CCs, means for determining a group CQI index based on the one or more reference signals, where the group CQI index is included in a set of multiple candidate CQI indices, and where the group CQI index corresponds to the group of CCs, and means for transmitting, to the base station, a report indicating the group CQI index.

A non-transitory computer-readable medium storing code for wireless communications at a UE is described. The code may include instructions executable by a processor to receive, from a base station, control signaling indicating a group of CCs and one or more subbands within the group of CCs, where the group of CCs includes a subset of a set of CCs, and where the set of CCs spans a bandwidth and each CC of the set occupies a different frequency range within the bandwidth, receive, from the base station, one or more reference signals within the one or more subbands within the group of CCs, determine a group CQI index based on the one or more reference signals, where the group CQI index is included in a set of multiple candidate CQI indices, and where the group CQI index corresponds to the group of CCs, and transmit, to the base station, a report indicating the group CQI index.

Some examples of the method, apparatuses, and non-transitory computer-readable medium described herein may further include operations, features, means, or instructions for determining, before determining the group CQI index, a prior subband CQI index for each of the one or more subbands, determining a respective adjustment factor for each of the one or more subbands based on the prior subband CQI indices, the respective adjustment factor for a subband indicating a relationship between a subband CQI index for the subband and the group CQI index, and transmitting, to the base station, an indication of the respective adjustment factor for each of the one or more subbands.

Some examples of the method, apparatuses, and non-transitory computer-readable medium described herein may further include operations, features, means, or instructions for receiving, from the base station, control signaling indicating a second group of CCs, the second group of CCs including at least one CC of the group of CCs, where at least one of the one or more subbands may be located within the second group of CCs.

Some examples of the method, apparatuses, and non-transitory computer-readable medium described herein may further include operations, features, means, or instructions for determining a second group CQI index based on one or more reference signals within the second group of CCs, where the second group CQI index may be included in the set of multiple candidate CQI indices, and where the second group CQI index corresponds to the second group of CCs and transmitting, to the base station, a report indicating the second group CQI index.

Some examples of the method, apparatuses, and non-transitory computer-readable medium described herein may further include operations, features, means, or instructions for receiving, from the base station, control signaling indicating a virtual CC, the virtual CC including two or more subbands within two or more CCs of the group of CCs and transmitting at least one of a wideband CQI report corresponding to the bandwidth, a subband CQI report, or both corresponding to the virtual CC.

Some examples of the method, apparatuses, and non-transitory computer-readable medium described herein may further include operations, features, means, or instructions for transmitting, to the base station, a CC group recommendation, where the CC group recommendation includes an indication of a second group of CCs, and where receiving the control signaling indicating the group of CCs may be based on the CC group recommendation.

In some examples of the method, apparatuses, and non-transitory computer-readable medium described herein, receiving the control signaling indicating the group of CCs and the one or more subbands may include operations, features, means, or instructions for receiving radio resource control (RRC) signaling that indicates the group of CCs and the one or more subbands.

In some examples of the method, apparatuses, and non-transitory computer-readable medium described herein, the group of CCs includes CCs that may be non-contiguous in frequency.

In some examples of the method, apparatuses, and non-transitory computer-readable medium described herein, the group of CCs includes CCs that may be contiguous in frequency.

A method for wireless communications at a base station is described. The method may include transmitting, to a UE, control signaling indicating a group of CCs and one or more subbands within the group of CCs, where the group of CCs includes a subset of a set of CCs, and where the set of CCs spans a bandwidth and each CC of the set occupies a different frequency range within the bandwidth, transmitting, to the UE, one or more reference signals within the one or more subbands, receiving, from the UE, a report indicating a group CQI index that corresponds to the group of CCs and is based on the one or more reference signals, and determining a subband CQI index for each of the one or more subbands based on the group CQI index.

An apparatus for wireless communications at a base station is described. The apparatus may include a processor, memory coupled (e.g., operatively, communicatively, functionally, electronically, or electrically) with the processor, and instructions stored in the memory. The instructions may be executable by the processor to cause the apparatus to transmit, to a UE, control signaling indicating a group of CCs and one or more subbands within the group of CCs, where the group of CCs includes a subset of a set of CCs, and where the set of CCs spans a bandwidth and each CC of the set occupies a different frequency range within the bandwidth, transmit, to the UE, one or more reference signals within the one or more subbands, receive, from the UE, a report indicating a group CQI index that corresponds to the group of CCs and is based on the one or more reference signals, and determine a subband CQI index for each of the one or more subbands based on the group CQI index.

Another apparatus for wireless communications at a base station is described. The apparatus may include means for transmitting, to a UE, control signaling indicating a group of CCs and one or more subbands within the group of CCs, where the group of CCs includes a subset of a set of CCs, and where the set of CCs spans a bandwidth and each CC of the set occupies a different frequency range within the bandwidth, means for transmitting, to the UE, one or more reference signals within the one or more subbands, means for receiving, from the UE, a report indicating a group CQI index that corresponds to the group of CCs and is based on the one or more reference signals, and means for determining a subband CQI index for each of the one or more subbands based on the group CQI index.

A non-transitory computer-readable medium storing code for wireless communications at a base station is described. The code may include instructions executable by a processor to transmit, to a UE, control signaling indicating a group of CCs and one or more subbands within the group of CCs, where the group of CCs includes a subset of a set of CCs, and where the set of CCs spans a bandwidth and each CC of the set occupies a different frequency range within the bandwidth, transmit, to the UE, one or more reference signals within the one or more subbands, receive, from the UE, a report indicating a group CQI index that corresponds to the group of CCs and is based on the one or more reference signals, and determine a subband CQI index for each of the one or more subbands based on the group CQI index.

Some examples of the method, apparatuses, and non-transitory computer-readable medium described herein may further include operations, features, means, or instructions for receiving, from the UE, an indication of a respective adjustment factor for each of the one or more subbands, where determining the subband CQI index for a subband of the one or more subbands may be based on the group CQI index and the respective adjustment factor for the subband.

Some examples of the method, apparatuses, and non-transitory computer-readable medium described herein may further include operations, features, means, or instructions for transmitting, to the UE, control signaling indicating a second group of CCs, the second group of CCs including at least one CC of the group of CCs, where at least one subband of the one or more subbands may be located within the second group of CCs.

Some examples of the method, apparatuses, and non-transitory computer-readable medium described herein may further include operations, features, means, or instructions for receiving, from the UE, a report indicating a second group CQI index that corresponds to the second group of CCs and may be based on one or more reference signals within the second group of CCs, where determining the subband CQI index for the at least one subband may be based on the group CQI index and the second group CQI index.

Some examples of the method, apparatuses, and non-transitory computer-readable medium described herein may further include operations, features, means, or instructions for transmitting, to the UE, control signaling indicating a virtual CC, the virtual CC including two or more subbands within two or more CCs of the set of CCs and receiving at least one of a wideband CQI report corresponding to the bandwidth, a subband CQI report, or both corresponding to the virtual CC.

Some examples of the method, apparatuses, and non-transitory computer-readable medium described herein may further include operations, features, means, or instructions for receiving, from the UE, a CC group recommendation, where the CC group recommendation includes an indication of a second group of CCs, and where transmitting the control signaling indicating the group of CCs may be based on the CC group recommendation.

In some examples of the method, apparatuses, and non-transitory computer-readable medium described herein, transmitting the control signaling indicating the group of CCs and the one or more subbands may include operations, features, means, or instructions for transmitting RRC signaling that indicates the group of CCs and the one or more subbands.

In some examples of the method, apparatuses, and non-transitory computer-readable medium described herein, the group of CCs includes CCs that may be non-contiguous in frequency.

In some examples of the method, apparatuses, and non-transitory computer-readable medium described herein, the group of CCs includes CCs that may be contiguous in frequency.

A method is described for wireless communications at a UE. The method may include receiving, from a base station, control signaling indicating a set of multiple subbands and a reference subband within the set of multiple subbands, receiving, from the base station, one or more reference signals within the reference subband and a second subband of the set of multiple subbands that is different than the reference subband, determining, based on the one or more reference signals, a first CQI index for the reference subband and a second CQI index for the second subband, the first CQI index and the second CQI index each included in a set of multiple candidate CQI indices, and transmitting, to the base station, a report indicating the first CQI index and a differential CQI value, where the differential CQI value indicates a difference between the first CQI index and the second CQI index.

An apparatus for wireless communications at a UE is described. The apparatus may include a processor, memory coupled (e.g., operatively, communicatively, functionally, electronically, or electrically) with the processor, and instructions stored in the memory. The instructions may be executable by the processor to cause the apparatus to receive, from a base station, control signaling indicating a set of multiple subbands and a reference subband within the set of multiple subbands, receive, from the base station, one or more reference signals within the reference subband and a second subband of the set of multiple subbands that is different than the reference subband, determine, based on the one or more reference signals, a first CQI index for the reference subband and a second CQI index for the second subband, the first CQI index and the second CQI index each included in a set of multiple candidate CQI indices, and transmit, to the base station, a report indicating the first CQI index and a differential CQI value, where the differential CQI value indicates a difference between the first CQI index and the second CQI index.

Another apparatus for wireless communications at a UE is described. The apparatus may include means for receiving, from a base station, control signaling indicating a set of multiple subbands and a reference subband within the set of multiple subbands, means for receiving, from the base station, one or more reference signals within the reference subband and a second subband of the set of multiple subbands that is different than the reference subband, means for determining, based on the one or more reference signals, a first CQI index for the reference subband and a second CQI index for the second subband, the first CQI index and the second CQI index each included in a set of multiple candidate CQI indices, and means for transmitting, to the base station, a report indicating the first CQI index and a differential CQI value, where the differential CQI value indicates a difference between the first CQI index and the second CQI index.

A non-transitory computer-readable medium storing code for wireless communications at a UE is described. The code may include instructions executable by a processor to receive, from a base station, control signaling indicating a set of multiple subbands and a reference subband within the set of multiple subbands, receive, from the base station, one or more reference signals within the reference subband and a second subband of the set of multiple subbands that is different than the reference subband, determine, based on the one or more reference signals, a first CQI index for the reference subband and a second CQI index for the second subband, the first CQI index and the second CQI index each included in a set of multiple candidate CQI indices, and transmit, to the base station, a report indicating the first CQI index and a differential CQI value, where the differential CQI value indicates a difference between the first CQI index and the second CQI index.

Some examples of the method, apparatuses, and non-transitory computer-readable medium described herein may further include operations, features, means, or instructions for receiving, from the base station, an indication of a mapping between the reference subband and a CC of a set of CCs, where the reference subband may be located within the CC.

Some examples of the method, apparatuses, and non-transitory computer-readable medium described herein may further include operations, features, means, or instructions for receiving, from the base station, an indication of a mapping between the reference subband and at least two CCs of a set of CCs, where the reference subband may be located within a CC of the at least two CCs.

Some examples of the method, apparatuses, and non-transitory computer-readable medium described herein may further include operations, features, means, or instructions for receiving, from the base station and after transmitting the report, control signaling indicating a second reference subband within the set of multiple subbands, the second reference subband different than the reference subband.

Some examples of the method, apparatuses, and non-transitory computer-readable medium described herein may further include operations, features, means, or instructions for determining a third CQI index for a third subband of the set of multiple subbands, the third subband different than the reference subband and the second subband, where the report indicates a second differential CQI indicating the difference between the first CQI index and the third CQI index.

Some examples of the method, apparatuses, and non-transitory computer-readable medium described herein may further include operations, features, means, or instructions for exchanging, with the base station, an indication of a quantity of bits included in an indication of the differential CQI value.

A method for wireless communications at a base station is described. The method may include transmitting, to a user equipment, control signaling indicating a set of multiple subbands and a reference subband within the set of multiple subbands, transmitting, to the UE, one or more reference signals within the reference subband and a second subband of the set of multiple subbands that is different than the reference subband, receiving, from the UE, a report indicating a first CQI index corresponding to the reference subband and a differential CQI value, where the differential CQI value indicates a difference between the first CQI index and a second CQI index corresponding to the second subband, and determining the second CQI index based on the first CQI index and the differential CQI value.

An apparatus for wireless communications at a base station is described. The apparatus may include a processor, memory coupled (e.g., operatively, communicatively, functionally, electronically, or electrically) with the processor, and instructions stored in the memory. The instructions may be executable by the processor to cause the apparatus to transmit, to a user equipment, control signaling indicating a set of multiple subbands and a reference subband within the set of multiple subbands, transmit, to the UE, one or more reference signals within the reference subband and a second subband of the set of multiple subbands that is different than the reference subband, receive, from the UE, a report indicating a first CQI index corresponding to the reference subband and a differential CQI value, where the differential CQI value indicates a difference between the first CQI index and a second CQI index corresponding to the second subband, and determine the second CQI index based on the first CQI index and the differential CQI value.

Another apparatus for wireless communications at a base station is described. The apparatus may include means for transmitting, to a user equipment, control signaling indicating a set of multiple subbands and a reference subband within the set of multiple subbands, means for transmitting, to the UE, one or more reference signals within the reference subband and a second subband of the set of multiple subbands that is different than the reference subband, means for receiving, from the UE, a report indicating a first CQI index corresponding to the reference subband and a differential CQI value, where the differential CQI value indicates a difference between the first CQI index and a second CQI index corresponding to the second subband, and means for determining the second CQI index based on the first CQI index and the differential CQI value.

A non-transitory computer-readable medium storing code for wireless communications at a base station is described. The code may include instructions executable by a processor to transmit, to a user equipment, control signaling indicating a set of multiple subbands and a reference subband within the set of multiple subbands, transmit, to the UE, one or more reference signals within the reference subband and a second subband of the set of multiple subbands that is different than the reference subband, receive, from the UE, a report indicating a first CQI index corresponding to the reference subband and a differential CQI value, where the differential CQI value indicates a difference between the first CQI index and a second CQI index corresponding to the second subband, and determine the second CQI index based on the first CQI index and the differential CQI value.

Some examples of the method, apparatuses, and non-transitory computer-readable medium described herein may further include operations, features, means, or instructions for transmitting, to the UE, an indication of a mapping between the reference subband and a CC of a set of CCs, where the subband may be located within the CC.

Some examples of the method, apparatuses, and non-transitory computer-readable medium described herein may further include operations, features, means, or instructions for transmitting, to the UE, an indication of a mapping between the reference subband and at least two CCs of a set of CCs, where the subband may be located within a CC of the at least two CCs.

Some examples of the method, apparatuses, and non-transitory computer-readable medium described herein may further include operations, features, means, or instructions for transmitting, to the UE and after receiving the report, control signaling indicating a second reference subband within the set of multiple subbands, the second reference subband different than the reference subband.

Some examples of the method, apparatuses, and non-transitory computer-readable medium described herein may further include operations, features, means, or instructions for receiving, from the UE, the report indicating a second differential CQI value, where the second differential CQI value indicates a difference between the first CQI index and a third CQI index corresponding to a third subband and determining the third CQI index based on the first CQI index and the second differential CQI value.

Some examples of the method, apparatuses, and non-transitory computer-readable medium described herein may further include operations, features, means, or instructions for exchanging, with the UE, an indication of a quantity of bits included in an indication of the differential CQI value.

DETAILED DESCRIPTION

Figure 1:
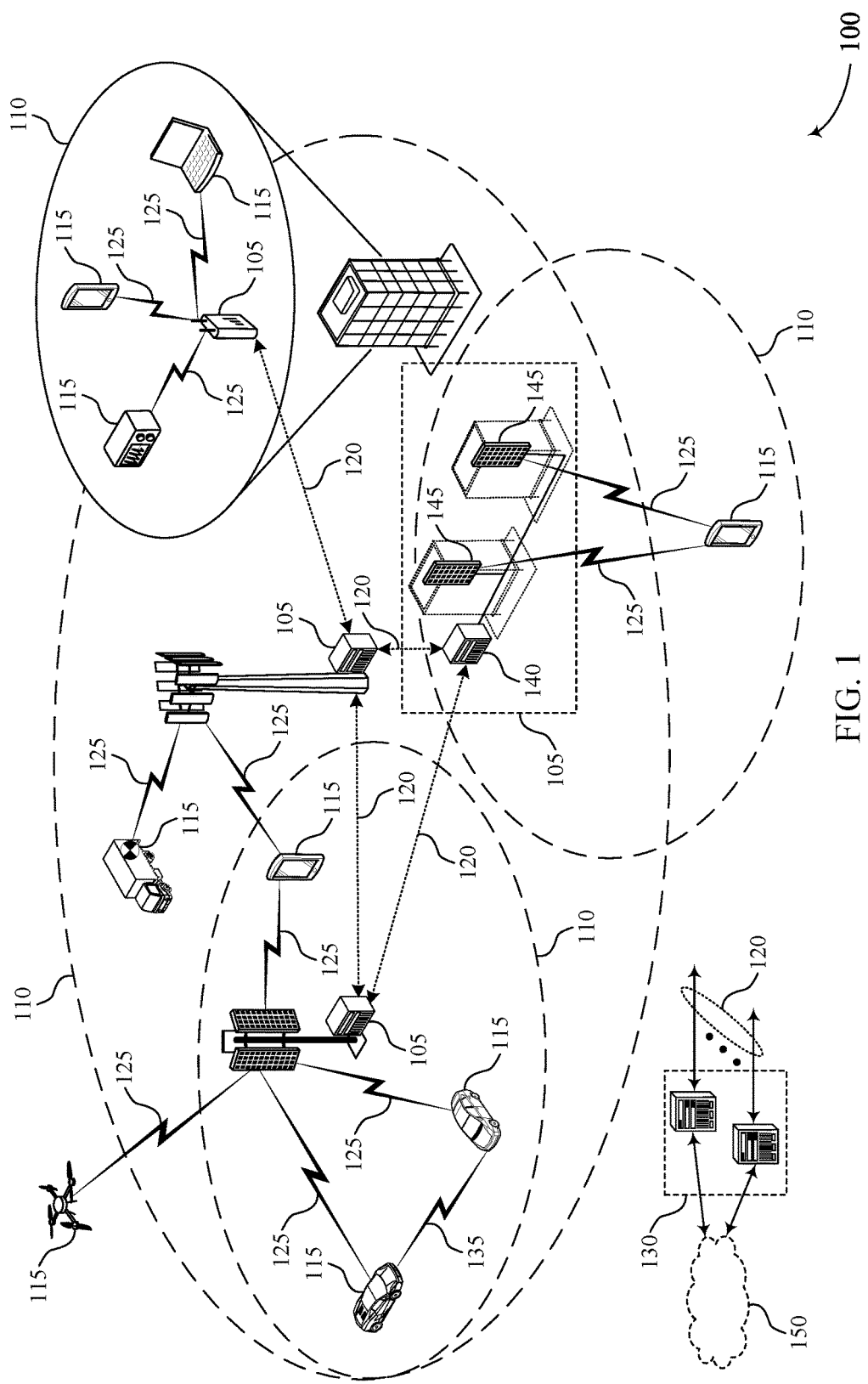
FIGS. 1 and 2 illustrate examples of a wireless communications system that supports channel quality indicator (CQI) reporting across multiple subbands in accordance with aspects of the present disclosure.

Some wireless communications systems may support channel quality indicator (CQI) reporting. For example, a base station may transmit one or more reference signals to a user equipment (UE). The UE may monitor for the reference signals, perform one or more measurements on the reference signals, and determine a CQI index value based on the one or more measurements. The UE may then report the CQI index value to the base station and the base station may use the CQI index value to derive a modulation and coding scheme (MCS) (e.g., based on a lookup table that relates CQI index values to different MCSs), which the base station may use for subsequent communications with the UE.

Some wireless communications systems may support subband CQI reporting and wideband CQI reporting. For instance, if subband CQI reporting is configured for the UE, a UE may report a specific CQI index value for each subband configured for the UE (e.g., the reported CQI index values may each correspond to a specific subband). If wideband CQI reporting is configured for the UE, the UE may report a single CQI index value for the entire bandwidth spanned by the set of subbands configured for the UE. In some examples, reporting a separate CQI index value for each subband may introduce a large amount of signaling overhead (e.g., where the operating bandwidth is relatively large and includes a relatively large quantity of component carriers (CCs), and hence a relatively large quantity of subbands, such as in FR4), reporting a single CQI index value for the entire bandwidth may be inaccurate (e.g., where the operating bandwidth is relatively large and thus channel quality may differ greatly across the set of configured CCs, such as in FR4), or both.

As described herein, the wireless communications system may support group CQI reporting. For example, a base station may transmit control signaling indicating a group of CCs and a set of subbands within the group of CCs. The CC group may collectively occupy only a subset of the overall operating bandwidth configured for transmissions between the base station or UE (e.g., may include only a subset of CCs within a set of CCs configured or available to be configured for the UE). The base station may transmit reference signals to the UE over the indicated set of subbands for the CC group, and the UE may calculate a group CQI index value based on the reference signals. The group CQI index value may be a single CQI index value for the CC group. The UE may transmit the group CQI index value to the base station, and the base station may derive a subband-specific CQI for each of the subbands of the set based on the group CQI (e.g., using channel fading, past subband CQI measurements corresponding to each of the set of subbands, or any combination thereof).

Additionally or alternatively, the wireless communications system may support differential CQI reporting. For example, a base station may transmit control signaling to a UE indicating a set of subbands and a reference subband for (e.g., within) the set of subbands. The base station may transmit one or more reference signals over the set of subbands and the UE may determine a respective CQI index value for the reference subband and each other subband of the set of subbands. The UE may then construct a report that includes an indication of the full CQI index value for the reference subband (e.g., a 6-bit indication) and a differential CQI index value (e.g., 2 bit indication) for each of the other subbands, where the CQI differential index value for a subband indicates a difference between the CQI index value for the reference subband and the CQI index value for the subband. The UE may transmit the report to the base station, and the base station may determine a subband-specific CQI index value for each of the subbands based on the report.

The techniques described herein may allow a UE to report CQI index values for multiple subbands—including for a large quantity of subbands or subbands spanning a wide frequency range—with reduced signaling overhead, improved accuracy, or both as compared to other methods.

Aspects of the disclosure are initially described in the context of wireless communications systems. Additional aspects of the disclosure are described in the contexts of a CQI reporting scheme and process flows. Aspects of the disclosure are further illustrated by and described with reference to apparatus diagrams, system diagrams, and flowcharts that relate to CQI reporting across multiple subbands.

FIG. 1 illustrates an example of a wireless communications system 100 that supports CQI reporting across multiple subbands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described herein, the wireless communications system 100 may support group CQI reporting. That is, a UE 115 reporting a group CQI index value to a base station 105, where the group CQI index corresponds to a group of CCs. For group CQI reporting, the UE 115 may receive control signaling from a base station 105 indicating a group of CCs. The group of CC may be a subset of set of CCs configured for the UE 115 and the base station 105. Additionally, the UE 115 may receive, from the base station 105, an indication of a set of subbands, where one or more subbands of the set occupies at least one CC of the group of CCs. The UE 115 may measure one or more reference signals over the one or more subbands and determine a group CQI index value for the group of CCs. The UE 115 may then transmit a report including the group CQI index to the base station 105 and the base station 105 may determine a subband CQI index value for each of the one or more subbands based on the group CQI index.

Figure 2:
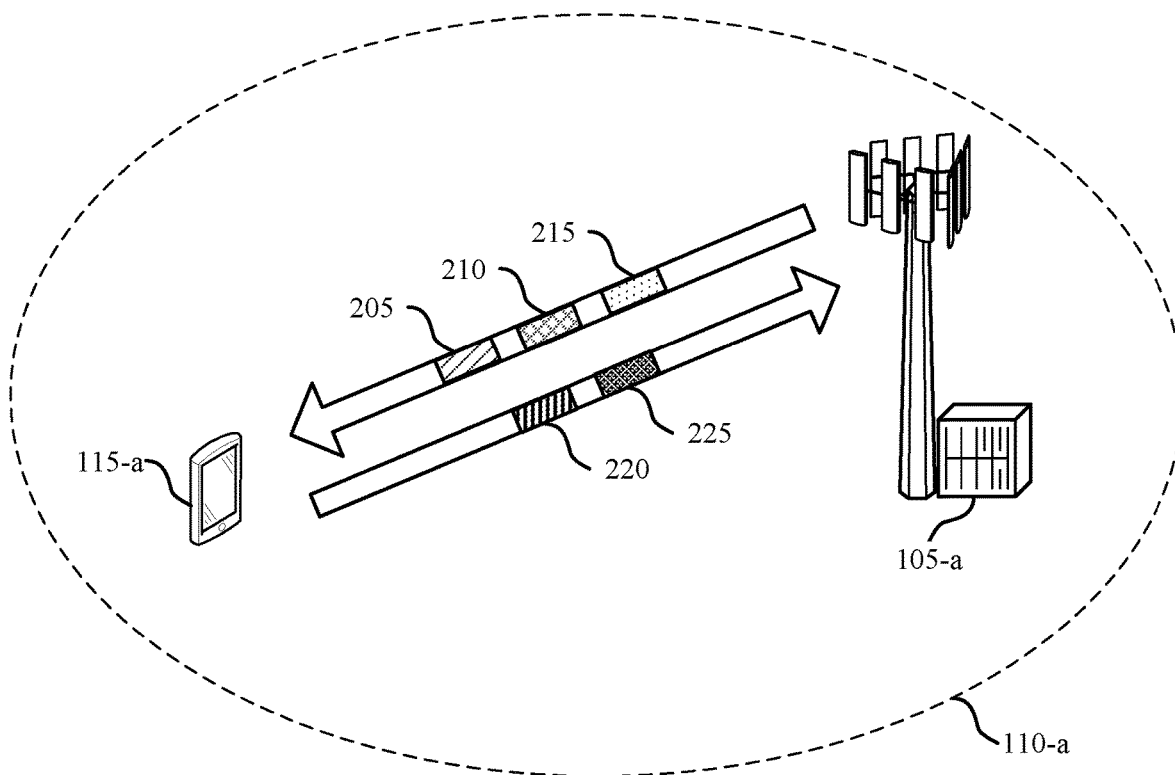

FIG. 2 illustrates an example of a wireless communications system 200 that supports CQI reporting across multiple subbands in accordance with aspects of the present disclosure. In some examples, the wireless communications system 200 may implement aspects of a wireless communications system 100. For example, the wireless communications system 200 may include a base station 105-a and a UE 115-a which may be examples of a base station 105 and a UE 115 as described with reference to FIG. 1. In some examples, the UE 115-a and the base station 105-a may be located within a coverage area 110-a.

In some examples, the wireless communications system 200 may support CQI reporting procedures. To support CQI reporting procedures, the UE 115-a may determine a signal strength value (e.g., signal-to-interference-plus-noise ratio (SINR)) associated with one or more reference signals received from the base station 105-a and convert the signal strength value into a CQI index value (e.g., a value between 0 and 15). The UE 115-a may transmit the CQI index value in a CQI report to the base station 105-a and the base station 105-a may utilize the CQI index value indicated in the CQI report to determine a MCS (e.g., from a lookup table or set of candidate MCSs) with which to communicate with the UE 115-a. In some examples, the UE 115-a may be configured (e.g., via radio resource control (RRC) signaling) to perform a specific type of CQI reporting. For example, the UE 115-a may be configured to perform subband CQI reporting or wideband CQI reporting. Additionally, the configuration may include a set of subbands (e.g., csi-reportingband). A size and a location of the subbands may be based on a predefined specification or an RRC configuration. If the UE 115-a is configured for subband CQI reporting, the UE 115-a may report CQI separately for each subband of the set of subbands as indicated by the base station 105-a. If the UE 115-a is configured for wideband CQI reporting, the UE 115-a may report a single CQI value for all of the subbands of the set of subbands as indicated by the base station 105-a (e.g., average CQI value for all of the subbands).

In some examples, the UE 115-a and the base station 105-a may have the capability to operate in a frequency band that spans a relatively large frequency range. For example, the UE 115-a and the base station 105-a may operate in FR4 or FR2. FR4 may span a frequency range of 52.6 to 114.25 GHz with an example span of 14 GHz (e.g., 57-71 GHz). In some examples, this 14 GHz band may be aggregated into seven CCs, where each CC spans 2 GHz. As such, the base station 105-a may request for information related to CQI for subbands situated across multiple CCs. But other techniques may not provide for efficient or accurate CQI reporting across multiple CCs. For example, if the UE 115-a operates in the large frequency range and is configured for subband CQI reporting, the UE 115-a may report a CQI index value for each of subbands that occupies the multiple CCs which may lead to significant feedback overhead. Alternatively, the UE 115-a may be configured for wideband CQI reporting and report a single CQI index value for all of subbands that occupy the multiple CCs. But characteristics of the channel may change drastically from one CC to the next due to the large frequency range (e.g., channel fading or beam squinting) and as such, the CQI index value indicated to the base station 105-a via wideband CQI may not be accurate to depict the CQI index value of each subband of the multiple CCs.

As described herein, the base station 105-a and the UE 115-a may support group CQI reporting procedures. That is, the UE 115-a may report a single CQI value for a group of configured CCs to the base station 105-a. In some examples, the UE 115-a and the base station 105-a may be capable of communicating over a set of CCs. The set of CCs may span a relatively large bandwidth. For example, in FR4, the set of CCs in the above example may span 14 GHz and the set of CCs may include seven CCs if a CC size of 2 GHz is assumed. In some examples, the base station 105-a may transmit control signaling indicating a set of subbands 210 to the UE 115-a, where each subband of the set of subbands 210 occupies a different CC of the set of CCs. As one example, the set of subbands 210 may include a first subband, a second subband, a third subband, and a fourth subband. Additionally, the base station 105-a may transmit control signaling indicating a group of CCs 205. The group of CCs 205 may include a subset of the set of CCs (e.g., two or three CCs of the seven CCs) and the group of CCs 205 may be contiguous or non-contiguous CCs. At least one subband of the set of subbands 210 may occupy a CC of the group of CCs 205. For example, the first subband of the set of subbands 210 may occupy one CC of the group of CCs 205 and the second subband of the set of subbands 210 may occupy a different CC of the group of CCs 205.

Upon transmitting the control signaling, the base station 105-a may transmit reference signals to the UE 115-a over the set of subbands 210. For example, the base station 105-a may transmit reference signals over one or more of the first subband, the second subband, the third subband, and the fourth subband. The UE 115-a may determine, from the one or more reference signals, a signal strength value (e.g., SINR) for each subband of the set of subbands 210 and in some examples, a CQI index value for each subbands of the set of subbands 210. In some examples, the UE 115-a may utilize the determined signal strength values or the determined CQI index values to identify a group CQI index value. For example, the UE 115-a may determine a signal strength value or a CQI index value for each of the first subband and the second subband and determine a CQI index value for the group of CCs 205 based on the signal strength value or the CQI index value of each the first subband and the second subband. In some examples, the group CQI index value may be a median or average CQI index value of all of the subbands that occupy a CC of the group of CCs 205. Once the UE 115-a determines the group CQI index value, the UE 115-a may transmit a group CQI report 220 to the base station 105-a that includes an indication of the group CQI index value (e.g., group-CQI-indication). The base station 105-a may receive the group CQI report 220 and utilize the group CQI index value to determine a CQI index value for each of the CCs included in the group of CCs 205.

In one example, the base station 105-a may determine the CQI index value for each subband of the group of CCs 205 based on information received from the UE 115-a. For example, the UE 115-a may transmit a CQI adjustment message to the base station 105-a, where the CQI adjustment message may indicate one or more group CQI index value adjustments for different subbands that occupy the group of CCs. In some examples, the UE 115-a may determine the one or more group CQI index value adjustments using prior CQI reports. For example, at a previous time, the UE 115-a may have been configured for subband CQI reporting and may have reported a CQI index value for the first subband and a CQI index value for the second subband to the base station 105-a. Based on this knowledge, the UE 115-a may determine how the group CQI index value may be adjusted to identify an accurate CQI index value for each of the subbands that occupy a CC of the group of CC 205 (e.g., the first subband and the second subband).

Alternatively or additionally, the base station 105-a and the UE 115-a may support differential CQI reporting. That is, the UE 115-a may transmit a subband CQI report 225 including a CQI index value of one subband (e.g., a reference subband) of the set of subbands 210 and some indication of a CQI index value of a different subband of the set of subbands 210. In such example, the base station 105-a may transmit control signaling indicating a set of subbands 210 as well as a reference subband 215 to the UE 115-a. The reference subband 215 may be a subband included in the set of subbands 210 and, in some examples, the base station 105-a may indicate more than one reference subband 215. For example, the base station 105-a may configure a unique reference subband for each CC of the group of CCs 205.

The base station 105-a may then transmit reference signals over the set of subbands 210. Upon receiving the reference signals from the base station 105-a, the UE 115-a may determine a signal strength value for each of the subbands of the set of subbands 210 and subsequently, a CQI index value for each of the subbands of the set of subbands 210. The UE 115-a may select a subband from the set of subbands 210 that is different from the reference subbands and determine a subband offset level between the reference subband CQI index value and the selected subband CQI index value. The subband offset level may be determined by subtracting the CQI index value of the reference subband from the CQI index value of a subband of interest (e.g., selected subband). For example, if the CQI index value is ten for the reference subband and a CQI index value is nine for the selected subband, the subband offset level may be one.

Once the subband offset level is determined, the UE 115-a may map the subband offset level to a subband differential CQI value (e.g., an offset level of one may map to subband differential CQI value of 1) and transmit a subband CQI report 225 to the base station 105-a, where the subband CQI report 225 may include the reference subband CQI index value and a bit indication (e.g., a two-bit indication) of the subband differential CQI value. In some examples, the UE 115-a may determine subband differential CQI values for two or more selected subbands and extend the bit indication to include an indication of the subband differential CQI values. Upon receiving the subband CQI report 225, the base station 105-a may determine the CQI index value of the selected subband using the CQI index value of the reference subband and the bit indication. Using the techniques as described herein may allow a UE 115-a to report CQI for multiple CCs without excess signaling overhead and with increased accuracy when compared to other methods (e.g., subband CQI reporting and wideband CQI reporting).

Figure 3:
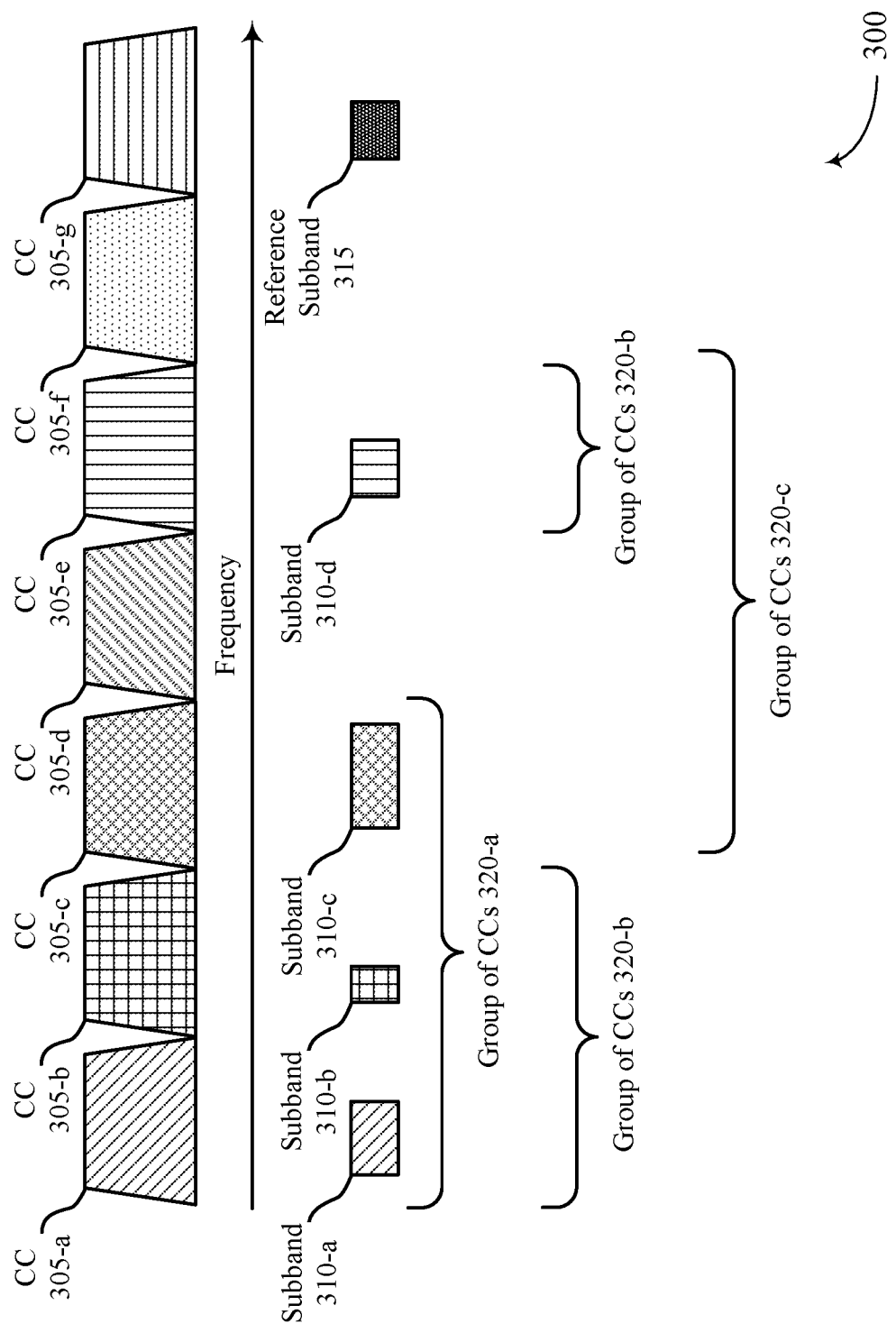
FIG. 3 illustrates an example of a CQI reporting scheme that supports CQI reporting across multiple subbands in accordance with aspects of the present disclosure.

FIG. 3 illustrates an example of a CQI reporting scheme 300 that supports CQI reporting across multiple subbands in accordance with aspects of the present disclosure. In some examples, the CQI reporting scheme 300 may be implemented by aspects of a wireless communications system 100 and a wireless communications system 200. For example, the CQI reporting scheme 300 may be implemented by a UE 115 and a base station 105 as described with reference to FIGS. 1 and 2.

In some examples, a UE and a base station may support a large operating bandwidth. For example, the UE and the base station may operate in FR4. As an example illustration of FR4, the operating bandwidth may be 14 GHz which may be split up into 7 CCs 305 (e.g., a CC 305-a, a CC 305-b, a CC 305-c, a CC 305-d, a CC 305-e, a CC 305-f, and a CC 305-g) when assuming a CC size of 2 GHz. As such, the UE may have the capability to communicate with the base station over any one of the CC 305-a-CC 305-g.

As described with reference to FIG. 2, a wireless communication system may support group CQI reporting. To support CQI reporting, the base station may transmit control signaling (e.g., RRC signaling) indicating a set of subbands 310 (e.g., csi-ReportingBand) to the UE. As one example, the set of subbands 310 may include one or more of a subband 310-a, a subband 310-b, a subband 310-c, and a subband 310-d. Additionally, the UE may receive control signaling indicating a group of CCs 320. The group of CCs 320 may be configured by the base station or the group of CCs 320 may be based on UE recommendation. In some examples, the group of CCs 320 may include a portion of the CCs 305 that occupy the operating bandwidth.

As one example, the CCs 305 included in the group of CCs 320 may be contiguous. For example, a group of CCs 320-a may include the CC 305-a, the CC 305-b, and the CC 305-c. In such example, the UE may receive reference signals from the base station over the subband 310-a, the subband 310-b, and the subband 310-c and determine a group CQI index value for the group of CCs 320-a based on the reference signals using methods as described in FIG. 2. As another example, the CCs 305 included in the group of CCs 320 may be non-contiguous. For example, a group of CCs 320-b may include the CC 305-a, the CC 305-b, and the CC 305-e. In such example, the UE may receive reference signals over the subband 310-a, the subband 310-b, and the subband 310-d and may determine a group CQI index value for the group of CCs 320-b based on the reference signals using methods as described in FIG. 2. Once the UE determines the group CQI index, the UE may transmit a report including the group CQI index to the base station and the base station may determine a CQI index value for each subband 310 included in the group of CCs 320 (e.g., the group of CCs 320-a or the group of CCs 320-b) using the group CQI index.

In some examples, the base station may determine a subband CQI index value based on two or more group CQI index values. For example, the UE may receive control signaling from the base station indicating two or more groups of CCs 320, where the two or more groups of CCs 320 include at least one of the same CC 305. As one example, the two or more groups of CCs 320 may be the group of CCs 320-a and a group of CCs 320-c. The group of CCs 320-a may include the CC 305-a, the CC 305-b, and the CC 305-c and the group of CCs 320-c may include the CC 305-c, the CC 305-d, and the CC 305-e. As such, the group of CCs 320-a and the group of CCs 320-b may share the CC 305-*c*. The UE may receive reference signals over the subband 310-*a*, the subband 310-*b*, the subbands 310-*c*, and the subband 310-*d* and determine a group CQI index value for the group of CCs 320-*a* based on the reference signals received over the subband 310-*a*, the subband 310-*b*, and the subbands 310-*c* and a group CQI index value for the group of CCs 320-*c* based on the reference signals received over the subbands 310-*c* and the subband 310-*d* using the methods as described in FIG. 2 (e.g., using channel fading information or prior CQI reports). The UE may report both group CQI index values to the base station and the base station may determine a subband CQI index value for the subband 310-*d* using the group CQI index value for the group of CCs 320-*a* and the group CQI index value for the group of CCs 320-*c*. Using the method as described herein, the UE may reduce overhead signaling when compared to other methods while still reporting CQI across multiple CCs.

As described in FIG. 2, the wireless communication system may support differential CQI reporting. To support differential CQI reporting, the UE may receive control signaling from the base station indicating a set of subbands 310. As one example, the set of subbands 310 may include one or more of a subband 310-*a*, a subband 310-*b*, a subband 310-*c*, and a subband 310-*d*. Additionally, the UE may receive control signaling from the base station indicating a reference subband 315. In some examples, the reference subband 315 may be included in the set of subbands 310 and in some examples, the base station may indicate more than one reference subband. For example, the base station may indicate a reference subband 315 for each CC 305. Additionally, the reference subband 315 may change with time. That is, the base station may dynamically change the reference subband via the control signaling to the UE. The UE may select one or more subbands 310 from the set of subbands 310 and receive reference signals over the selected one or more subbands 310 as well as the reference subbands 315. As an example, the UE may select the subband 310-*d*. Based on the reference signals, the UE may determine a CQI index value for each of the one or more selected subbands 310 and an index value of the reference subband 315. For example, the UE may determine that the CQI index value for the subband 310-*d* is 11 and the CQI index value for the reference subband 315 is 9.

Once the UE determines the CQI index value for the one or more selected subbands 310 and the reference subband 315, the UE may determine a quantized version of a difference between the CQI index values of the one or more selected subbands 310 and the reference subband 315. Quantization may be carried out according to a pre-determined quantization rule or a pre-configured quantization rule between the base station and the UE. An example of the pre-determined quantization rule is described with reference to FIG. 2. The UE may report, to the base station, the CQI index value of the reference subband 215 along with a bit indication of the quantization version of the difference between the CQI index values of the one or more selected subbands 310 and the reference subband 315. Using the CQI index value and the bit indication, the base station may determine a CQI index value for the one or more selected subbands (e.g., the subband 310-*d*). Using the methods as described herein may allow a UE to reduce overhead signaling when compared to other methods while reporting CQI across multiple CCs.

Figure 4:
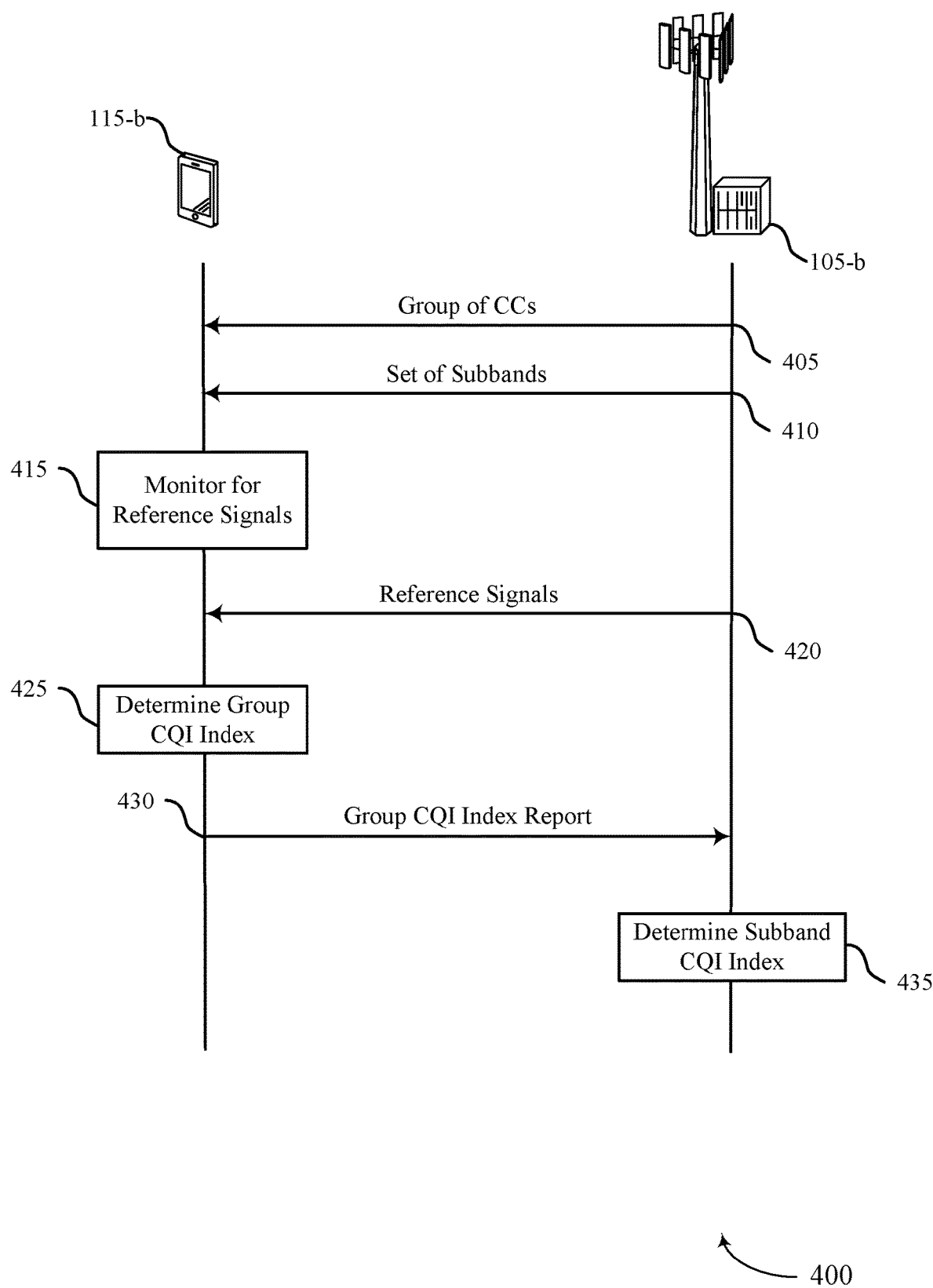
FIGS. 4 and 5 illustrate examples of a process flow that supports CQI reporting across multiple subbands in accordance with aspects of the present disclosure.

FIG. 4 illustrates an example of a process flow 400 that supports CQI reporting across multiple subbands in accordance with aspects of the present disclosure. In some examples, the process flow 400 may implement aspects of wireless communications system 100 and a wireless communications system 200. For example, the process flow 400 may implement or be implemented by a UE 115-*b* and a base station 105-*b* which may be examples of a UE 115 and a base station 105 as described with reference to FIGS. 1 and 2.

In the following description of the process flow 400, the operations between the UE 115-*b* and the base station 105-*b* may be performed in different orders or at different times. Some operations may also be left out of the process flow 400, or other operations may be added to the process flow 400. While the UE 115-*b* and the base station 105-*b* are shown performing the operations of process flow 400, any wireless communication device may perform the operations shown.

At 405, a base station 105-*b* may transmit control signaling (e.g., RRC signaling) to a UE 115-*b* indicating a group of CCs. In some cases, the group of CCs may include a subset of a set of CCs, where the set of CCs may span an operating bandwidth configured for the UE 115-*b* and the base station 105-*b* (e.g., some bandwidth configured in FR4 or FR2). Each CC of the set of CCs may occupy a different frequency range within the bandwidth and may be contiguous or non-contiguous in frequency with respect to one another. In some cases, the base station 105-*b* may additionally transmit control signaling to the UE 115-*b* indicating a second group of CCs. The second group of CCs may include at least one CC of the group of CCs. In some cases, prior to receiving the indication of the group of CCs at 405, the UE 115-*b* may transmit, to the base station 105-*b*, a CC group recommendation indicating a preferred group of CCs chosen by the UE 115-*b*. Based on the CC group recommendation, the base station 105-*b* may select the group of CCs.

At 410, the base station 105-*b* may transmit control signaling (e.g., RRC signaling) to the UE 115-*b* indicating a set of subbands. In some examples, at least one subband of the set may be located within the group of CCs as indicated at 405. In the case that the base station 105-*b* transmits control signaling indicating a second group of CCs, at least the one subband of the set of subbands may also be located within the second group of CCs. In some examples, the UE 115-*b* may group at least two or more subbands of the set of subbands together as one virtual CC.

At 415, the UE 115-*b* may monitor the set of subbands for one or more reference signals from the base station 105-*b*. Upon receiving the reference signals at 420, the UE 115-*b* may determine a group CQI index for the group of CCs at 425 based on the one or more reference signals. In some examples, the UE 115-*b* may determine a subband CQI index for each subband located with the group of CCs and determine the group CQI index for the group of CCs based on the subband CQI indices at 425. The UE 115-*b* may determine the group CQI from a set of candidate group CQI indices (e.g., from a table of CQI indices). In some cases, the UE 115-*b* may additionally determine a second group CQI index, where the second group CQI index corresponds to the second group of CCs.

In some cases, before determining the group CQI index for the group of CCs, the UE 115-*b* may determine a prior subband CQI index for each of the subbands included in the group of CCs. For example, the UE 115-*b* may have previously performed subband CQI reporting and determined the CQI index for each of the subbands included in the group of CCs. In such example, based on the previous subband CQIs, the UE 115-*b* may determine an adjustment factor for each subband included in the group of CCs with respect to the group CQI index. The adjustment factor may indicate a relationship between a subband CQI index and the group CQI index. The UE 115-*b* may transmit an indication of the adjustment factor to the base station 105-*b*.

At 430, the UE 115-*b* may transmit a report indicating the group CQI index to the base station 105-*b*. Additionally or alternatively, the UE may transmit a subband CQI report or a wideband CQI report corresponding to the virtual CC. Additionally, the UE 115-*b* may transmit a report including the second group CQI index to the base station 105-*b*.

At 435, the base station 105-*b* may determine a subband CQI index for each of subbands included in the group of CCs based on the group CQI index received from the UE 115-*b* at 430. In some cases, the base station 105-*b* may determine the subbands CQIs based on the adjustment factor. In some cases, the base station 105-*b* may determine the subband CQIs using two or more group CQI indexes. For example, the base station may determine a subband CQI for a subband located in the group of CC and the second group of CCs using the group CQI index of the group of CCs and the group CQI index of the second group of CCs.

Figure 5:
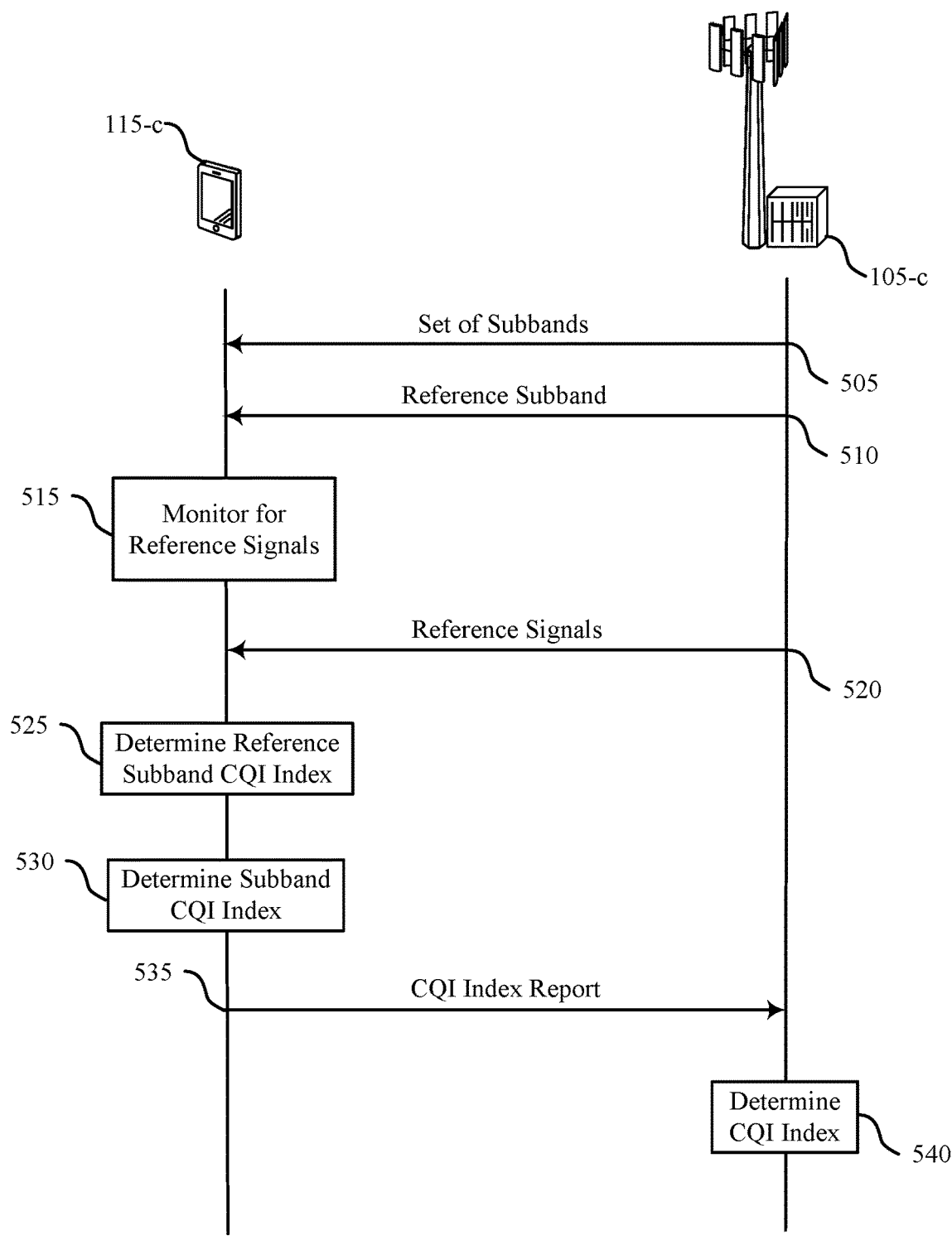

FIG. 5 illustrates an example of a process flow 500 that supports CQI reporting across multiple subbands in accordance with aspects of the present disclosure. In some cases, the process flow 500 may implement aspects of wireless communications system 100 and a wireless communications system 200. For example, the process flow 500 may implement or be implemented by a UE 115-*c* and a base station 105-*c* which may be examples of a UE 115 and a base station 105 as described with reference to FIGS. 1 and 2.

In the following description of the process flow 500, the operations between UE 115-*c* and base station 105-*c* may be performed in different orders or at different times. Some operations may also be left out of the process flow 500, or other operations may be added to the process flow 500. While UE 115-*c* and base station 105-*c* are shown performing the operations of process flow 500, any wireless communication device may perform the operations shown.

At 505, a base station 105-*c* may transmit control signaling indicating a set of subbands to the UE 115-*c*. Each subband of the set of subbands may be located within a CC of a set of CCs, where the set of CCs span an operating bandwidth configured for the UE 115-*c* and the base station 105-*c*.

At 510, the base station 105-*c* may transmit control signaling including a reference subband, where the reference subband may be included in the set of subbands. In some cases, the base station 105-*c* may transmit an indication of a mapping between the reference subband and a CC of a set of CCs, where the CC may contain the reference subband. That is, the base station 105-*c* may transmit an indication of more than one reference subband. Alternatively, the base station 105-*c* may transmit an indication of a mapping between the reference subband and at least two CCs of a set of CCs.

At 515, the UE 115-*c* may monitor for one or more reference signals within the reference subband and a subband of the plurality of subbands different from the reference subband. Upon receiving the one or more reference signals at 520, the UE 115-*c* may determine a first CQI index for the reference subband at 525 and a second CQI index for the subband at 530 based on the one or more reference signals received at 520. In some cases, the UE 115-*c* may determine a third CQI index for a second subband of the set of subbands that is different from the reference subband and the subband.

At 535, the UE 115-*c* may transmit a CQI index report to the base station 105-*c*. The CQI index report may include an indication of the first CQI index and a differential CQI value. The differential CQI value may indicate a difference between the first CQI index and the second CQI index. In some cases, the CQI index report may include a second differential CQI indicating the difference between the first CQI index and the third CQI index.

At 540, the base station 105-*c* may determine the second CQI index based on the CQI index report. That is, the base station 105-*c* may determine the second CQI index based on the first CQI index and the differential CQI index value. In some cases, the base station 105-*c* may receive the CQI report indicating a second differential CQI value and the base station 105-*c* may determine the third CQI index based on the first CQI index and the second differential CQI value.

Figure 6:
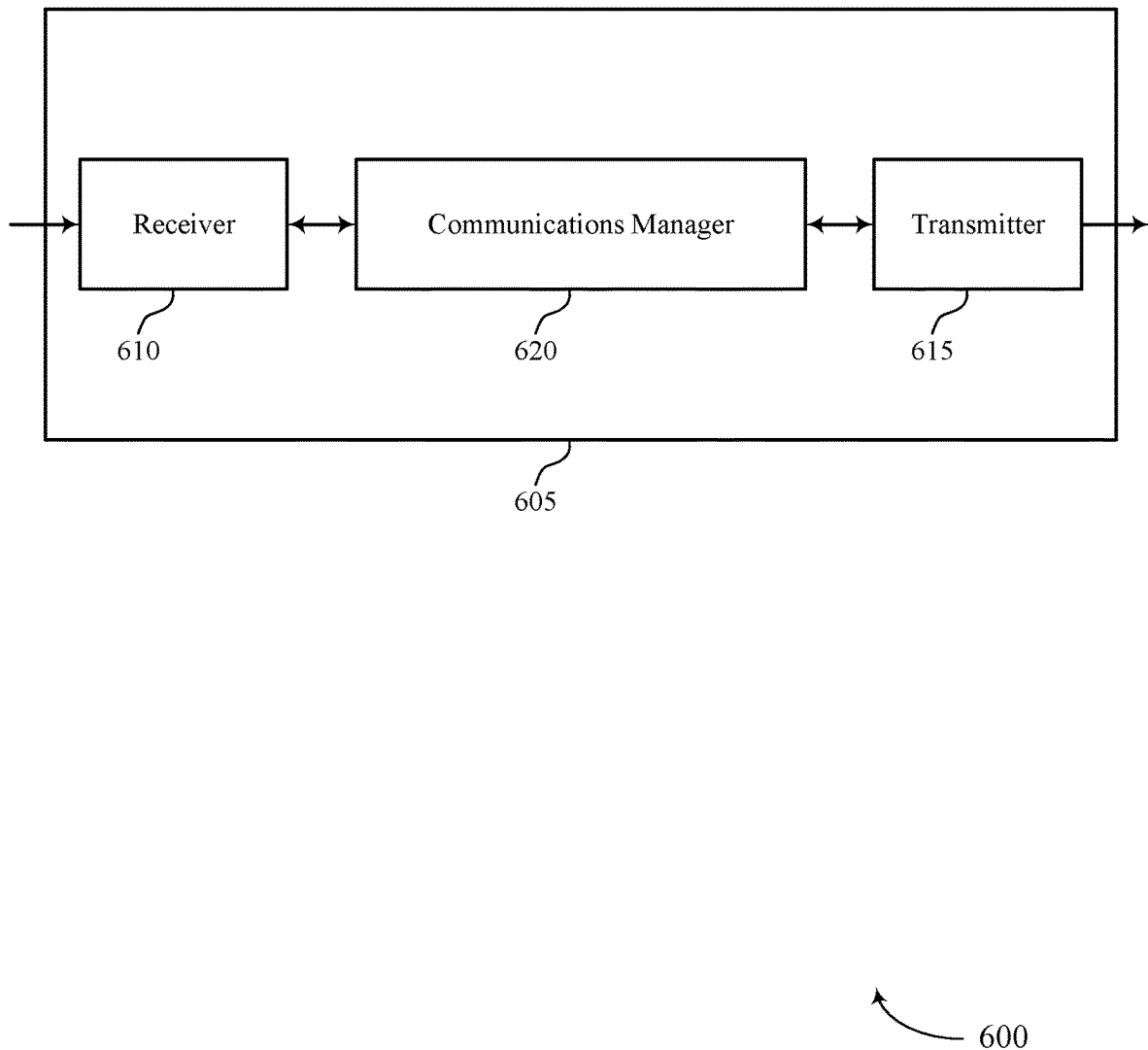
FIGS. 6 and 7 show block diagrams of devices that support CQI reporting across multiple subbands in accordance with aspects of the present disclosure.

FIG. 6 shows a block diagram 600 of a device 605 that supports CQI reporting across multiple subbands in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to CQI reporting across multiple subbands). Information may be passed on to other components of the device 605. The receiver 610 may utilize a single antenna or a set of multiple antennas. For example, antennas included in the receiver 610 may be combined in different ways in analog, hybrid or digital beamforming with analog beamforming corresponding to the use of a single radio frequency (RF) chain for all the antennas, digital beamforming corresponding to the use of as many RF chains as the number of antennas, and hybrid beamforming corresponding to the use of a number of RF chains intermediate between one and number of antenna elements for the set of antennas. An RF chain may correspond to the use of a mixer (down/up converter), switches, an analog-to-digital converter and/or a digital-to-analog converter.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CQI reporting across multiple subbands). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of CQI reporting across multiple subbands as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The communications manager 620 may be configured as or otherwise support a means for receiving, from the base station, one or more reference signals within the one or more subbands within the group of CCs. The communications manager 620 may be configured as or otherwise support a means for determining a group CQI index based on the one or more reference signals, where the group CQI index is included in a set of multiple candidate CQI indices, and where the group CQI index corresponds to the group of CCs. The communications manager 620 may be configured as or otherwise support a means for transmitting, to the base station, a report indicating the group CQI index.

For example, the communications manager 620 may be configured as or otherwise support a means for receiving, from a base station, control signaling indicating a set of multiple subbands and a reference subband within the set of multiple subbands. The communications manager 620 may be configured as or otherwise support a means for receiving, from the base station, one or more reference signals within the reference subband and a second subband of the set of multiple subbands that is different than the reference subband. The communications manager 620 may be configured as or otherwise support a means for determining, based on the one or more reference signals, a first CQI index for the reference subband and a second CQI index for the second subband, the first CQI index and the second CQI index each included in a set of multiple candidate CQI indices. The communications manager 620 may be configured as or otherwise support a means for transmitting, to the base station, a report indicating the first CQI index and a differential CQI value, where the differential CQI value indicates a difference between the first CQI index and the second CQI index.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and more efficient utilization of communication resources. Using the techniques as described herein, may allow the device 605 to report a single group CQI index to a base station for which multiple CQI indices may be derived from (e.g., CQI indices of multiple subbands occupying a group of CCs). Reporting a single group CQI index may allow the device 605 to reduce processing when compared to other methods such as subband CQI reporting while still providing CQI information across multiple subbands.

Figure 7:
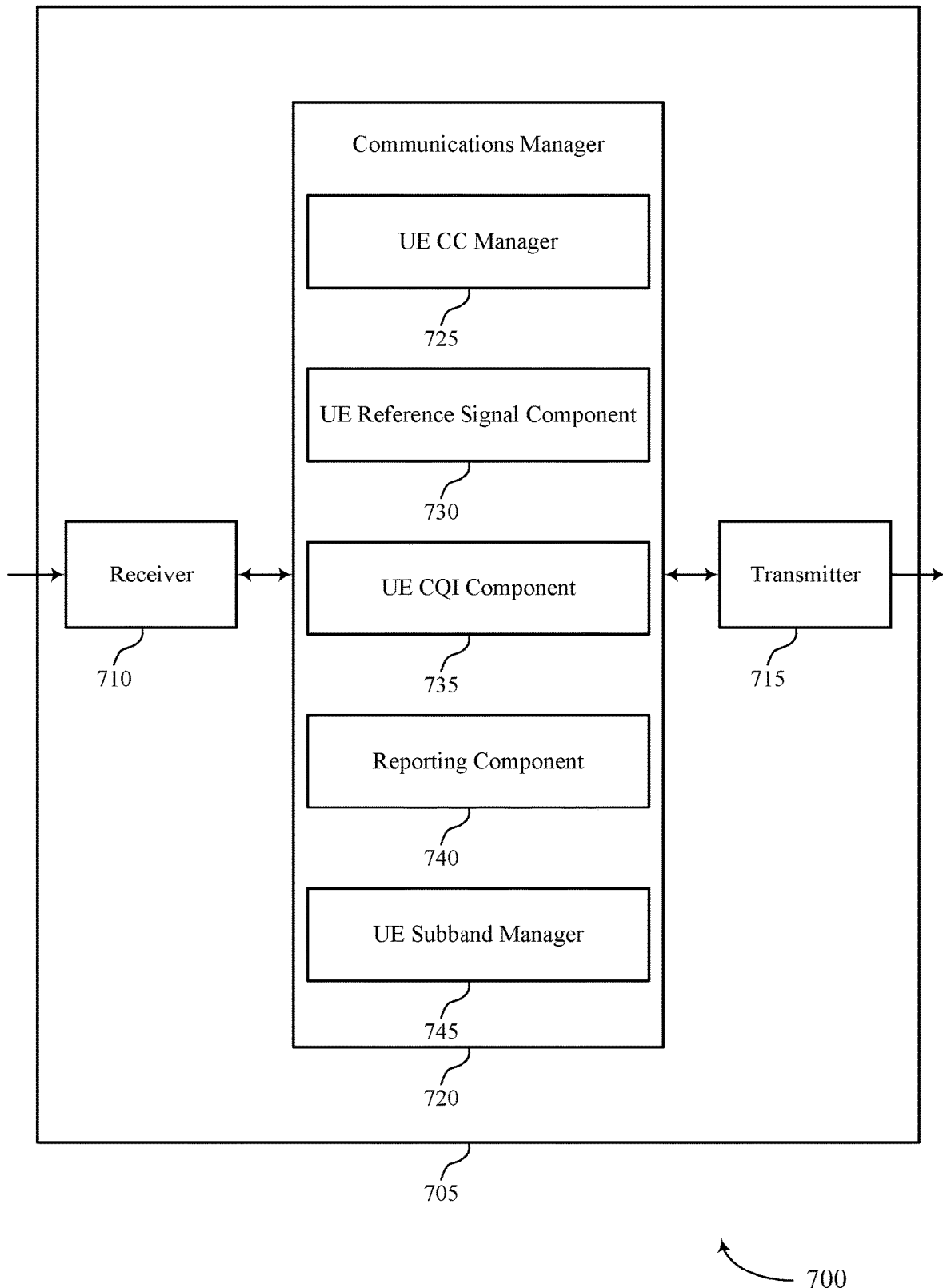

FIG. 7 shows a block diagram 700 of a device 705 that supports CQI reporting across multiple subbands in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to CQI reporting across multiple subbands). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to CQI reporting across multiple subbands). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of CQI reporting across multiple subbands as described herein. For example, the communications manager 720 may include a UE CC manager 725, a UE reference signal component 730, a UE CQI component 735, a reporting component 740, a UE subband manager 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The UE CC manager 725 may be configured as or otherwise support a means for receiving, from a base station, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The UE reference signal component 730 may be configured as or otherwise support a means for receiving, from the base station, one or more reference signals within the one or more subbands within the group of CCs. The UE CQI component 735 may be configured as or otherwise support a means for determining a group CQI index based on the one or more reference signals, where the group CQI index is included in a set of multiple candidate CQI indices, and where the group CQI index corresponds to the group of CCs. The reporting component 740 may be configured as or otherwise support a means for transmitting, to the base station, a report indicating the group CQI index.

The UE subband manager 745 may be configured as or otherwise support a means for receiving, from a base station, control signaling indicating a set of multiple subbands and a reference subband within the set of multiple subbands. The UE reference signal component 730 may be configured as or otherwise support a means for receiving, from the base station, one or more reference signals within the reference subband and a second subband of the set of multiple subbands that is different than the reference subband. The UE CQI component 735 may be configured as or otherwise support a means for determining, based on the one or more reference signals, a first CQI index for the reference subband and a second CQI index for the second subband, the first CQI index and the second CQI index each included in a set of multiple candidate CQI indices. The reporting component 740 may be configured as or otherwise support a means for transmitting, to the base station, a report indicating the first CQI index and a differential CQI value, where the differential CQI value indicates a difference between the first CQI index and the second CQI index.

Figure 8:
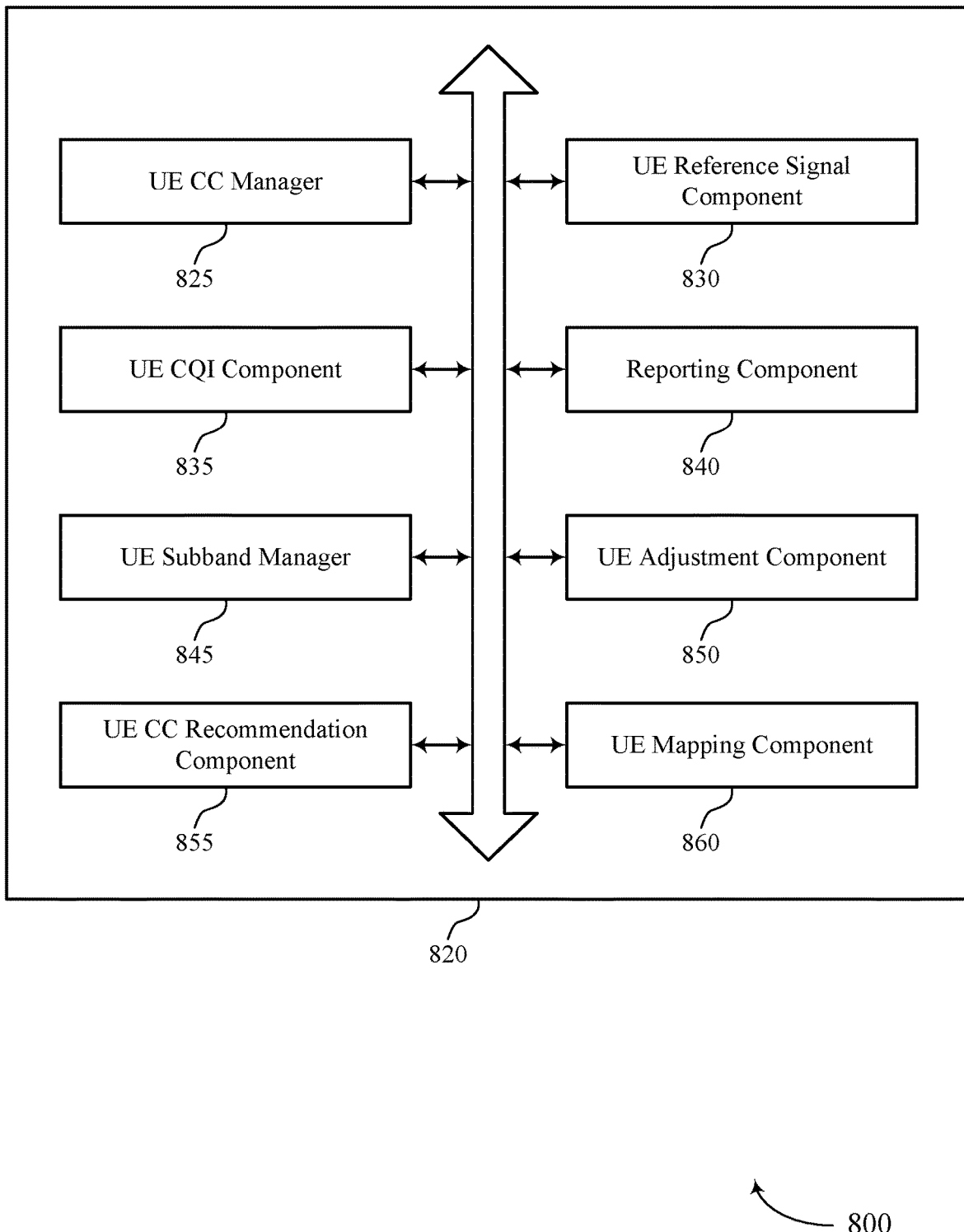
FIG. 8 shows a block diagram of a communications manager that supports CQI reporting across multiple subbands in accordance with aspects of the present disclosure.

FIG. 8 shows a block diagram 800 of a communications manager 820 that supports CQI reporting across multiple subbands in accordance with aspects of the present disclosure. The communications manager 820 may be an example of aspects of a communications manager 620, a communications manager 720, or both, as described herein. The communications manager 820, or various components thereof, may be an example of means for performing various aspects of CQI reporting across multiple subbands as described herein. For example, the communications manager 820 may include a UE CC manager 825, a UE reference signal component 830, a UE CQI component 835, a reporting component 840, a UE subband manager 845, a UE adjustment component 850, a UE CC recommendation component 855, a UE mapping component 860, or any combination thereof. Each of these components may communicate, directly or indirectly, with one another (e.g., via one or more buses).

The communications manager 820 may support wireless communications at a UE in accordance with examples as disclosed herein. The UE CC manager 825 may be configured as or otherwise support a means for receiving, from a base station, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The UE reference signal component 830 may be configured as or otherwise support a means for receiving, from the base station, one or more reference signals within the one or more subbands within the group of CCs. The UE CQI component 835 may be configured as or otherwise support a means for determining a group CQI index based on the one or more reference signals, where the group CQI index is included in a set of multiple candidate CQI indices, and where the group CQI index corresponds to the group of CCs. The reporting component 840 may be configured as or otherwise support a means for transmitting, to the base station, a report indicating the group CQI index.

In some examples, the UE CQI component 835 may be configured as or otherwise support a means for determining, before determining the group CQI index, a prior subband CQI index for each of the one or more subbands. In some examples, the UE adjustment component 850 may be configured as or otherwise support a means for determining a respective adjustment factor for each of the one or more subbands based on the prior subband CQI indices, the respective adjustment factor for a subband indicating a relationship between a subband CQI index for the subband and the group CQI index. In some examples, the UE adjustment component 850 may be configured as or otherwise support a means for transmitting, to the base station, an indication of the respective adjustment factor for each of the one or more subbands.

In some examples, the UE CC manager 825 may be configured as or otherwise support a means for receiving, from the base station, control signaling indicating a second group of CCs, the second group of CCs including at least one CC of the group of CCs, where at least one of the one or more subbands is located within the second group of CCs.

In some examples, the UE CQI component 835 may be configured as or otherwise support a means for determining a second group CQI index based on one or more reference signals within the second group of CCs, where the second group CQI index is included in the set of multiple candidate CQI indices, and where the second group CQI index corresponds to the second group of CCs. In some examples, the reporting component 840 may be configured as or otherwise support a means for transmitting, to the base station, a report indicating the second group CQI index.

In some examples, the UE CC manager 825 may be configured as or otherwise support a means for receiving, from the base station, control signaling indicating a virtual CC, the virtual CC including two or more subbands within two or more CCs of the group of CCs. In some examples, the reporting component 840 may be configured as or otherwise support a means for transmitting at least one of a wideband CQI report corresponding to the bandwidth, a subband CQI report, or both corresponding to the virtual CC.

In some examples, the UE CC recommendation component 855 may be configured as or otherwise support a means for transmitting, to the base station, a CC group recommendation, where the CC group recommendation includes an indication of a second group of CCs, and where receiving the control signaling indicating the group of CCs is based on the CC group recommendation.

In some examples, to support receiving the control signaling indicating the group of CCs and the one or more subbands, the UE CC manager 825 may be configured as or otherwise support a means for receiving RRC signaling that indicates the group of CCs and the one or more subbands.

In some examples, the group of CCs includes CCs that are non-contiguous in frequency. In some examples, the group of CCs includes CCs that are contiguous in frequency.

The UE subband manager 845 may be configured as or otherwise support a means for receiving, from a base station, control signaling indicating a set of multiple subbands and a reference subband within the set of multiple subbands. In some examples, the UE reference signal component 830 may be configured as or otherwise support a means for receiving, from the base station, one or more reference signals within the reference subband and a second subband of the set of multiple subbands that is different than the reference subband. In some examples, the UE CQI component 835 may be configured as or otherwise support a means for determining, based on the one or more reference signals, a first CQI index for the reference subband and a second CQI index for the second subband, the first CQI index and the second CQI index each included in a set of multiple candidate CQI indices. In some examples, the reporting component 840 may be configured as or otherwise support a means for transmitting, to the base station, a report indicating the first CQI index and a differential CQI value, where the differential CQI value indicates a difference between the first CQI index and the second CQI index.

In some examples, the UE mapping component 860 may be configured as or otherwise support a means for receiving, from the base station, an indication of a mapping between the reference subband and a CC of a set of CCs, where the reference subband is located within the CC.

In some examples, the UE mapping component 860 may be configured as or otherwise support a means for receiving, from the base station, an indication of a mapping between the reference subband and at least two CCs of a set of CCs, where the reference subband is located within a CC of the at least two CCs.

In some examples, the UE subband manager 845 may be configured as or otherwise support a means for receiving, from the base station and after transmitting the report, control signaling indicating a second reference subband within the set of multiple subbands, the second reference subband different than the reference subband.

In some examples, the UE CQI component 835 may be configured as or otherwise support a means for determining a third CQI index for a third subband of the set of multiple subbands, the third subband different than the reference subband and the second subband, where the report indicates a second differential CQI indicating the difference between the first CQI index and the third CQI index.

In some examples, the reporting component 840 may be configured as or otherwise support a means for exchanging, with the base station, an indication of a quantity of bits included in an indication of the differential CQI value.

Figure 9:
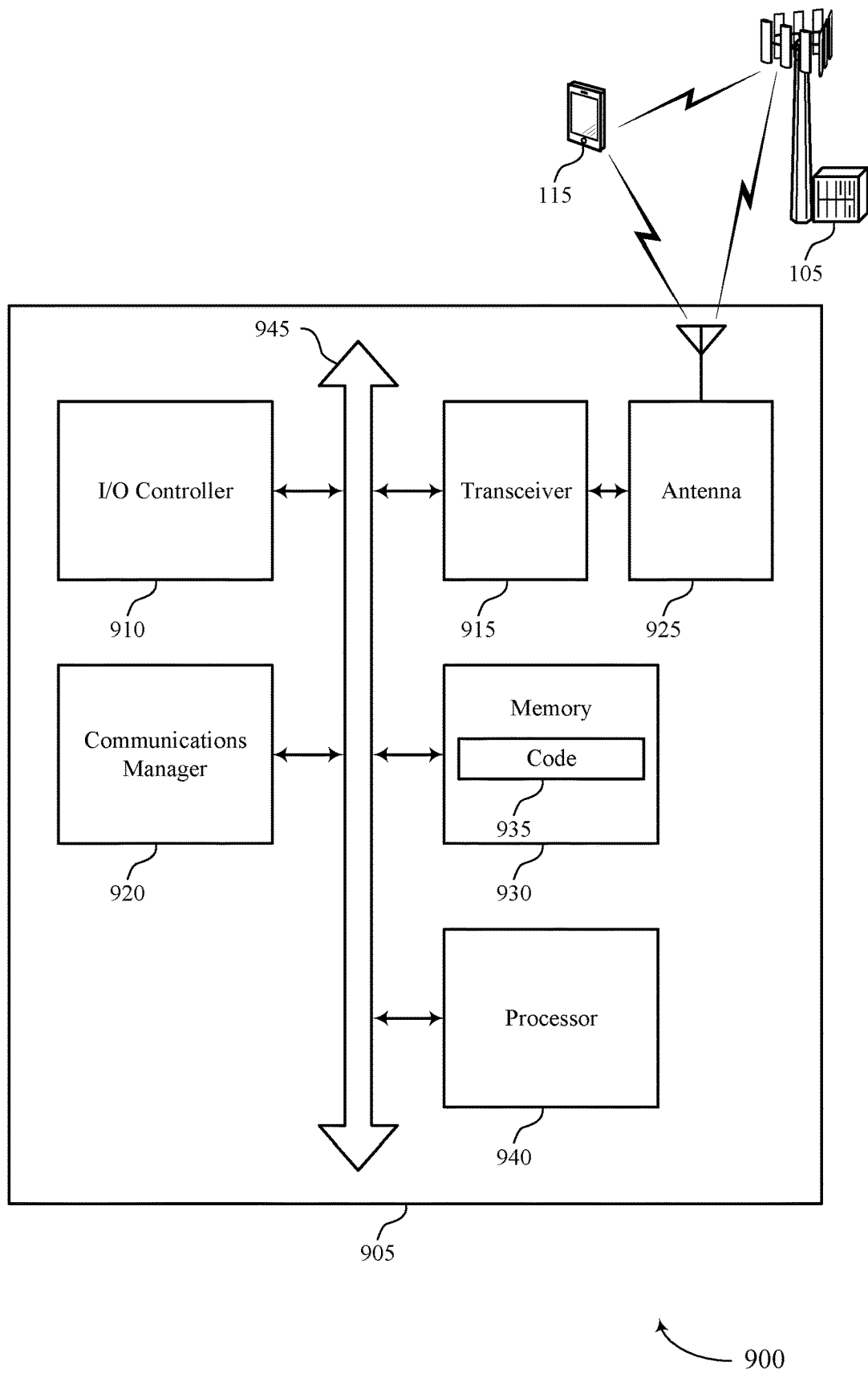
FIG. 9 shows a diagram of a system including a device that supports CQI reporting across multiple subbands in accordance with aspects of the present disclosure.

FIG. 9 shows a diagram of a system 900 including a device 905 that supports CQI reporting across multiple subbands in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940.

These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting CQI reporting across multiple subbands). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The communications manager 920 may be configured as or otherwise support a means for receiving, from the base station, one or more reference signals within the one or more subbands within the group of CCs. The communications manager 920 may be configured as or otherwise support a means for determining a group CQI index based on the one or more reference signals, where the group CQI index is included in a set of multiple candidate CQI indices, and where the group CQI index corresponds to the group of CCs. The communications manager 920 may be configured as or otherwise support a means for transmitting, to the base station, a report indicating the group CQI index.

For example, the communications manager 920 may be configured as or otherwise support a means for receiving, from a base station, control signaling indicating a set of multiple subbands and a reference subband within the set of multiple subbands. The communications manager 920 may be configured as or otherwise support a means for receiving, from the base station, one or more reference signals within the reference subband and a second subband of the set of multiple subbands that is different than the reference subband. The communications manager 920 may be configured as or otherwise support a means for determining, based on the one or more reference signals, a first CQI index for the reference subband and a second CQI index for the second subband, the first CQI index and the second CQI index each included in a set of multiple candidate CQI indices. The communications manager 920 may be configured as or otherwise support a means for transmitting, to the base station, a report indicating the first CQI index and a differential CQI value, where the differential CQI value indicates a difference between the first CQI index and the second CQI index.

By including or configuring the communications manager 920 in accordance with examples as described herein, the device 905 may support techniques for improved communication reliability. As described herein, a base station may determine a CQI index for each subband of a group of CCs based on a group CQI index provided by the device 605 and other information provided by the device 605 (e.g., adjustment factor). Determining a CQI index for each subband based on the above factors may allow the base station to determine a more accurate MCS when compared to other methods (e.g., wideband CQI reporting) resulting in improved communication reliability with the device 605

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of CQI reporting across multiple subbands as described herein, or the processor 940 and the memory 930 may be otherwise configured to perform or support such operations.

Figure 10:
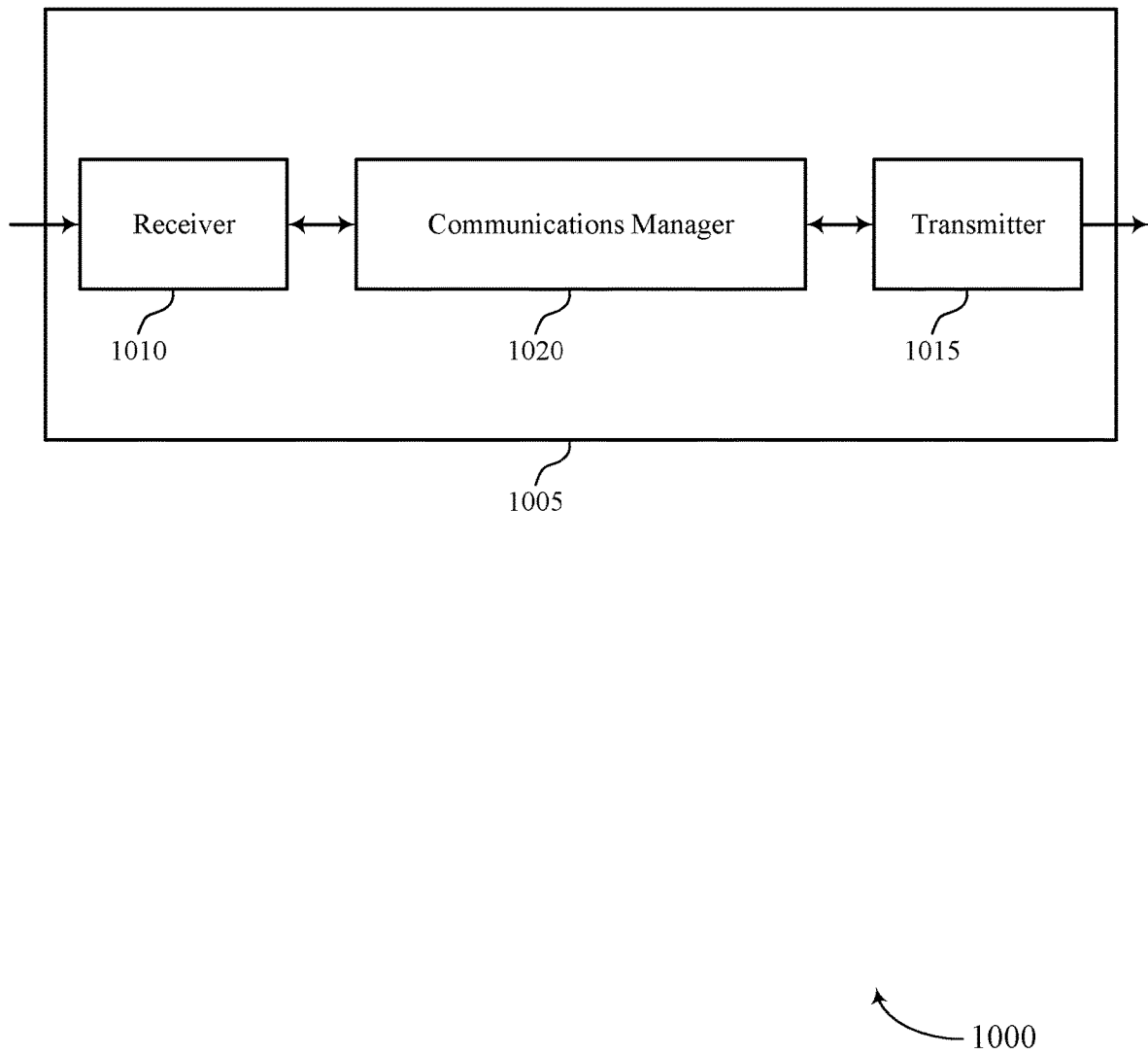
FIGS. 10 and 11 show block diagrams of devices that support CQI reporting across multiple subbands in accordance with aspects of the present disclosure.

FIG. 10 shows a block diagram 1000 of a device 1005 that supports CQI reporting across multiple subbands in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to CQI reporting across multiple subbands). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to CQI reporting across multiple subbands). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of CQI reporting across multiple subbands as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

For example, the communications manager 1020 may be configured as or otherwise support a means for transmitting, to a UE, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The communications manager 1020 may be configured as or otherwise support a means for transmitting, to the UE, one or more reference signals within the one or more subbands. The communications manager 1020 may be configured as or otherwise support a means for receiving, from the UE, a report indicating a group CQI index that corresponds to the group of CCs and is based on the one or more reference signals. The communications manager 1020 may be configured as or otherwise support a means for determining a subband CQI index for each of the one or more subbands based on the group CQI index.

For example, the communications manager 1020 may be configured as or otherwise support a means for transmitting, to a user equipment, control signaling indicating a set of multiple subbands and a reference subband within the set of multiple subbands. The communications manager 1020 may be configured as or otherwise support a means for transmitting, to the UE, one or more reference signals within the reference subband and a second subband of the set of multiple subbands that is different than the reference subband. The communications manager 1020 may be configured as or otherwise support a means for receiving, from the UE, a report indicating a first CQI index corresponding to the reference subband and a differential CQI value, where the differential CQI value indicates a difference between the first CQI index and a second CQI index corresponding to the second subband. The communications manager 1020 may be configured as or otherwise support a means for determining the second CQI index based on the first CQI index and the differential CQI value.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing and more efficient utilization of communication resources.

Figure 11:
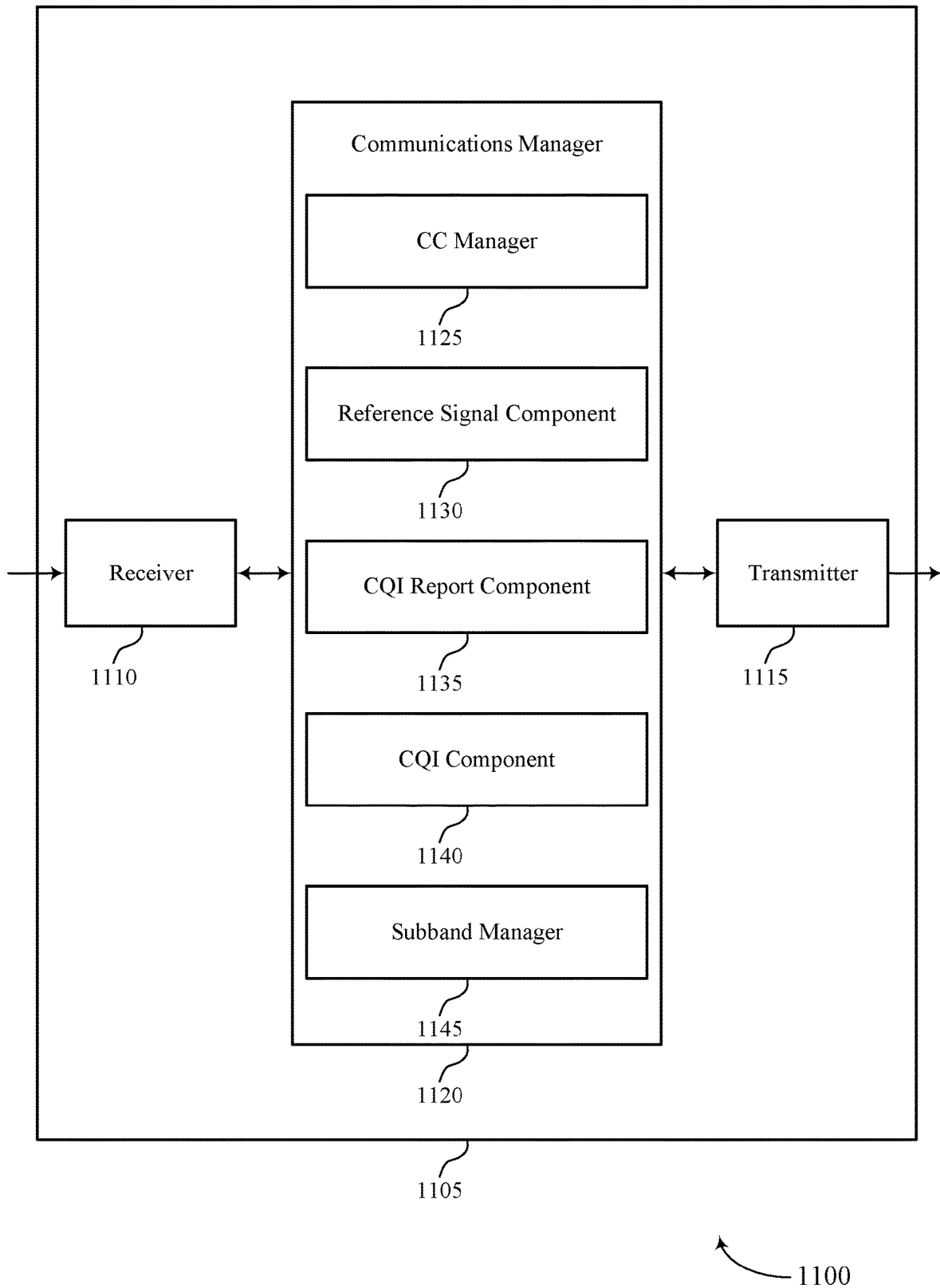

FIG. 11 shows a block diagram 1100 of a device 1105 that supports CQI reporting across multiple subbands in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to CQI reporting across multiple subbands). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to CQI reporting across multiple subbands). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of CQI reporting across multiple subbands as described herein. For example, the communications manager 1120 may include a CC manager 1125, a reference signal component 1130, a CQI report component 1135, a CQI component 1140, a subband manager 1145, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The CC manager 1125 may be configured as or otherwise support a means for transmitting, to a UE, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The reference signal component 1130 may be configured as or otherwise support a means for transmitting, to the UE, one or more reference signals within the one or more subbands. The CQI report component 1135 may be configured as or otherwise support a means for receiving, from the UE, a report indicating a group CQI index that corresponds to the group of CCs and is based on the one or more reference signals. The CQI component 1140 may be configured as or otherwise support a means for determining a subband CQI index for each of the one or more subbands based on the group CQI index.

The subband manager 1145 may be configured as or otherwise support a means for transmitting, to a user equipment, control signaling indicating a set of multiple subbands and a reference subband within the set of multiple subbands. The reference signal component 1130 may be configured as or otherwise support a means for transmitting, to the UE, one or more reference signals within the reference subband and a second subband of the set of multiple subbands that is different than the reference subband. The CQI report component 1135 may be configured as or otherwise support a means for receiving, from the UE, a report indicating a first CQI index corresponding to the reference subband and a differential CQI value, where the differential CQI value indicates a difference between the first CQI index and a second CQI index corresponding to the second subband. The CQI component 1140 may be configured as or otherwise support a means for determining the second CQI index based on the first CQI index and the differential CQI value.

Figure 12:
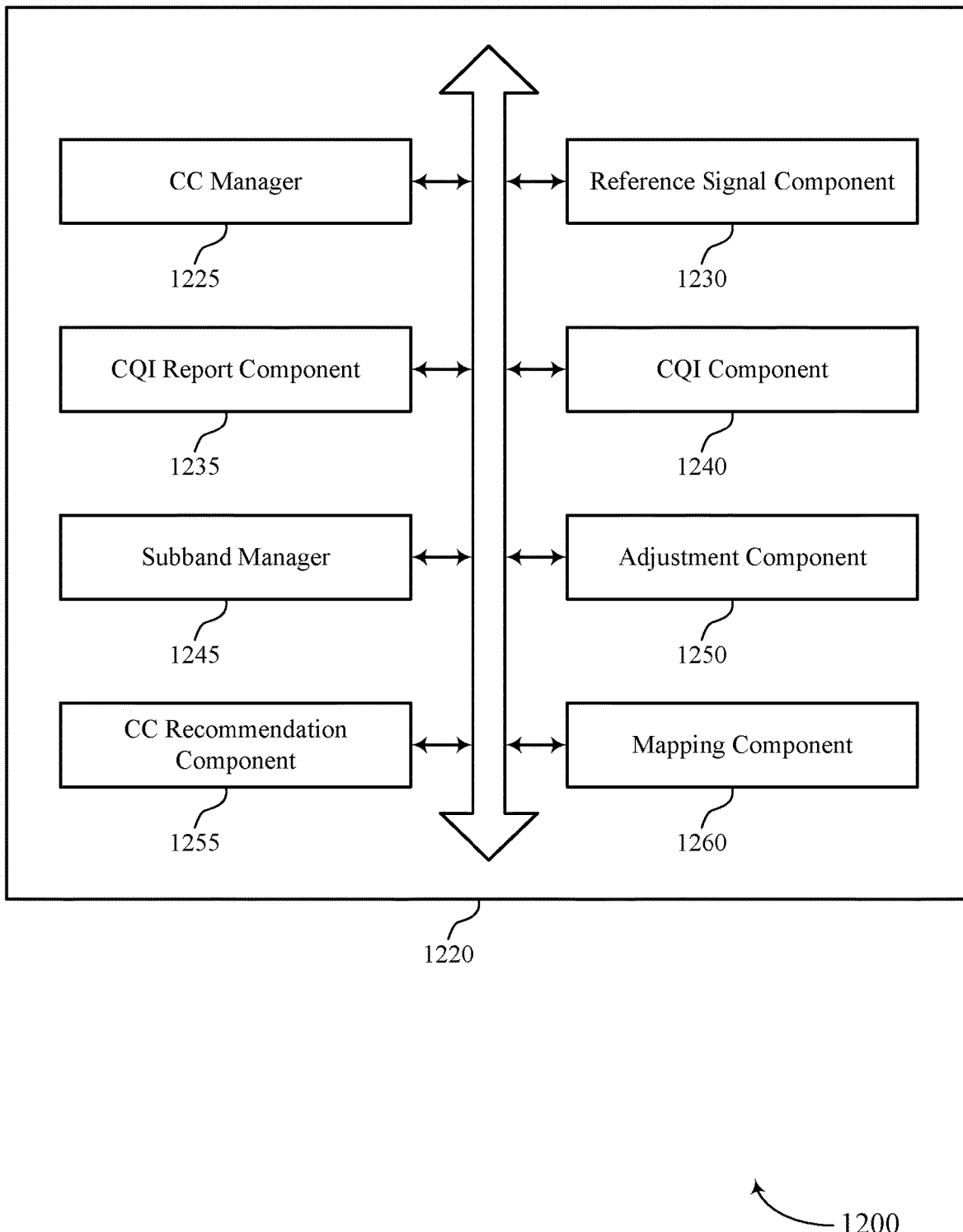
FIG. 12 shows a block diagram of a communications manager that supports CQI reporting across multiple subbands in accordance with aspects of the present disclosure.

FIG. 12 shows a block diagram 1200 of a communications manager 1220 that supports CQI reporting across multiple subbands in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of CQI reporting across multiple subbands as described herein. For example, the communications manager 1220 may include a CC manager 1225, a reference signal component 1230, a CQI report component 1235, a CQI component 1240, a subband manager 1245, an adjustment component 1250, a CC recommendation component 1255, a mapping component 1260, or any combination thereof. Each of these components may communicate, directly or indirectly, with one another (e.g., via one or more buses).

The CC manager 1225 may be configured as or otherwise support a means for transmitting, to a UE, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The reference signal component 1230 may be configured as or otherwise support a means for transmitting, to the UE, one or more reference signals within the one or more subbands. The CQI report component 1235 may be configured as or otherwise support a means for receiving, from the UE, a report indicating a group CQI index that corresponds to the group of CCs and is based on the one or more reference signals. The CQI component 1240 may be configured as or otherwise support a means for determining a subband CQI index for each of the one or more subbands based on the group CQI index.

In some examples, the adjustment component 1250 may be configured as or otherwise support a means for receiving, from the UE, an indication of a respective adjustment factor for each of the one or more subbands, where determining the subband CQI index for a subband of the one or more subbands is based on the group CQI index and the respective adjustment factor for the subband.

In some examples, the CC manager 1225 may be configured as or otherwise support a means for transmitting, to the UE, control signaling indicating a second group of CCs, the second group of CCs including at least one CC of the group of CCs, where at least one subband of the one or more subbands is located within the second group of CCs.

In some examples, the CQI report component 1235 may be configured as or otherwise support a means for receiving, from the UE, a report indicating a second group CQI index that corresponds to the second group of CCs and is based on one or more reference signals within the second group of CCs, where determining the subband CQI index for the at least one subband is based on the group CQI index and the second group CQI index.

In some examples, the CC manager 1225 may be configured as or otherwise support a means for transmitting, to the UE, control signaling indicating a virtual CC, the virtual CC including two or more subbands within two or more CCs of the set of CCs. In some examples, the CQI report component 1235 may be configured as or otherwise support a means for receiving at least one of a wideband CQI report corresponding to the bandwidth, a subband CQI report, or both corresponding to the virtual CC.

In some examples, the CC recommendation component 1255 may be configured as or otherwise support a means for receiving, from the UE, a CC group recommendation, where the CC group recommendation includes an indication of a second group of CCs, and where transmitting the control signaling indicating the group of CCs is based on the CC group recommendation.

In some examples, to support transmitting the control signaling indicating the group of CCs and the one or more subbands, the CC manager 1225 may be configured as or otherwise support a means for transmitting RRC signaling that indicates the group of CCs and the one or more subbands.

In some examples, the group of CCs includes CCs that are non-contiguous in frequency. In some examples, the group of CCs includes CCs that are contiguous in frequency.

The subband manager 1245 may be configured as or otherwise support a means for transmitting, to a user equipment, control signaling indicating a set of multiple subbands and a reference subband within the set of multiple subbands. In some examples, the reference signal component 1230 may be configured as or otherwise support a means for transmitting, to the UE, one or more reference signals within the reference subband and a second subband of the set of multiple subbands that is different than the reference subband. In some examples, the CQI report component 1235 may be configured as or otherwise support a means for receiving, from the UE, a report indicating a first CQI index corresponding to the reference subband and a differential CQI value, where the differential CQI value indicates a difference between the first CQI index and a second CQI index corresponding to the second subband. In some examples, the CQI component 1240 may be configured as or otherwise support a means for determining the second CQI index based on the first CQI index and the differential CQI value.

In some examples, the mapping component 1260 may be configured as or otherwise support a means for transmitting, to the UE, an indication of a mapping between the reference subband and a CC of a set of CCs, where the reference subband is located within the CC.

In some examples, the mapping component 1260 may be configured as or otherwise support a means for transmitting, to the UE, an indication of a mapping between the reference subband and at least two CCs of a set of CCs, where the reference subband is located within a CC of the at least two CCs.

In some examples, the subband manager 1245 may be configured as or otherwise support a means for transmitting, to the UE and after receiving the report, control signaling indicating a second reference subband within the set of multiple subbands, the second reference subband different than the reference subband.

In some examples, the CQI report component 1235 may be configured as or otherwise support a means for receiving, from the UE, the report indicating a second differential CQI value, where the second differential CQI value indicates a difference between the first CQI index and a third CQI index corresponding to a third subband. In some examples, the CQI component 1240 may be configured as or otherwise support a means for determining the third CQI index based on the first CQI index and the second differential CQI value.

In some examples, the CQI report component 1235 may be configured as or otherwise support a means for exchanging, with the UE, an indication of a quantity of bits included in an indication of the differential CQI value.

Figure 13:
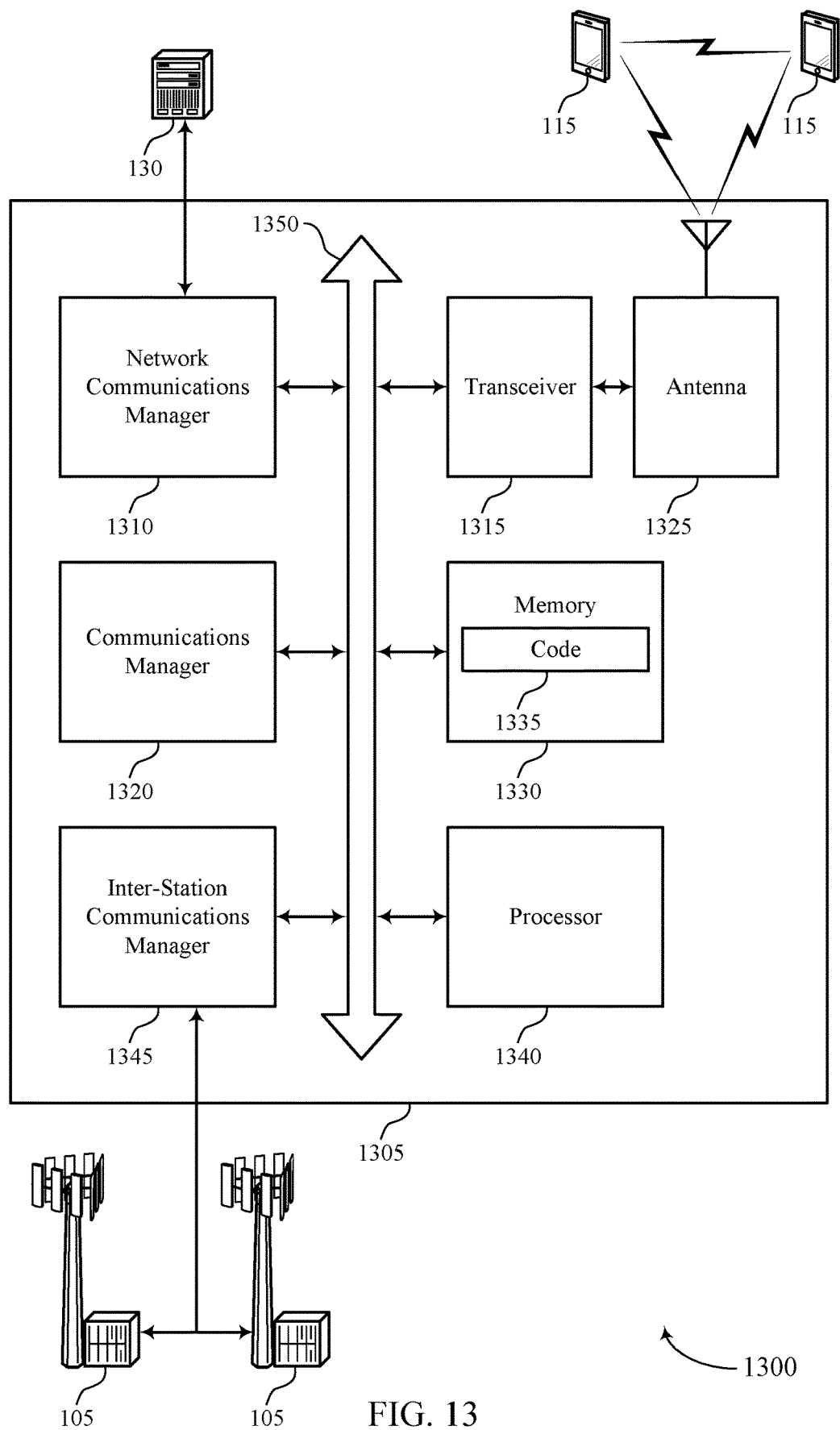
FIG. 13 shows a diagram of a system including a device that supports CQI reporting across multiple subbands in accordance with aspects of the present disclosure.

FIG. 13 shows a diagram of a system 1300 including a device 1305 that supports CQI reporting across multiple subbands in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting CQI reporting across multiple subbands). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

For example, the communications manager 1320 may be configured as or otherwise support a means for transmitting, to a UE, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The communications manager 1320 may be configured as or otherwise support a means for transmitting, to the UE, one or more reference signals within the one or more subbands. The communications manager 1320 may be configured as or otherwise support a means for receiving, from the UE, a report indicating a group CQI index that corresponds to the group of CCs and is based on the one or more reference signals. The communications manager 1320 may be configured as or otherwise support a means for determining a subband CQI index for each of the one or more subbands based on the group CQI index.

For example, the communications manager 1320 may be configured as or otherwise support a means for transmitting, to a user equipment, control signaling indicating a set of multiple subbands and a reference subband within the set of multiple subbands. The communications manager 1320 may be configured as or otherwise support a means for transmitting, to the UE, one or more reference signals within the reference subband and a second subband of the set of multiple subbands that is different than the reference subband. The communications manager 1320 may be configured as or otherwise support a means for receiving, from the UE, a report indicating a first CQI index corresponding to the reference subband and a differential CQI value, where the differential CQI value indicates a difference between the first CQI index and a second CQI index corresponding to the second subband. The communications manager 1320 may be configured as or otherwise support a means for determining the second CQI index based on the first CQI index and the differential CQI value.

By including or configuring the communications manager 1320 in accordance with examples as described herein, the device 1305 may support techniques for improved communication reliability, reduced latency.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of CQI reporting across multiple subbands as described herein, or the processor 1340 and the memory 1330 may be otherwise configured to perform or support such operations.

Figure 14:
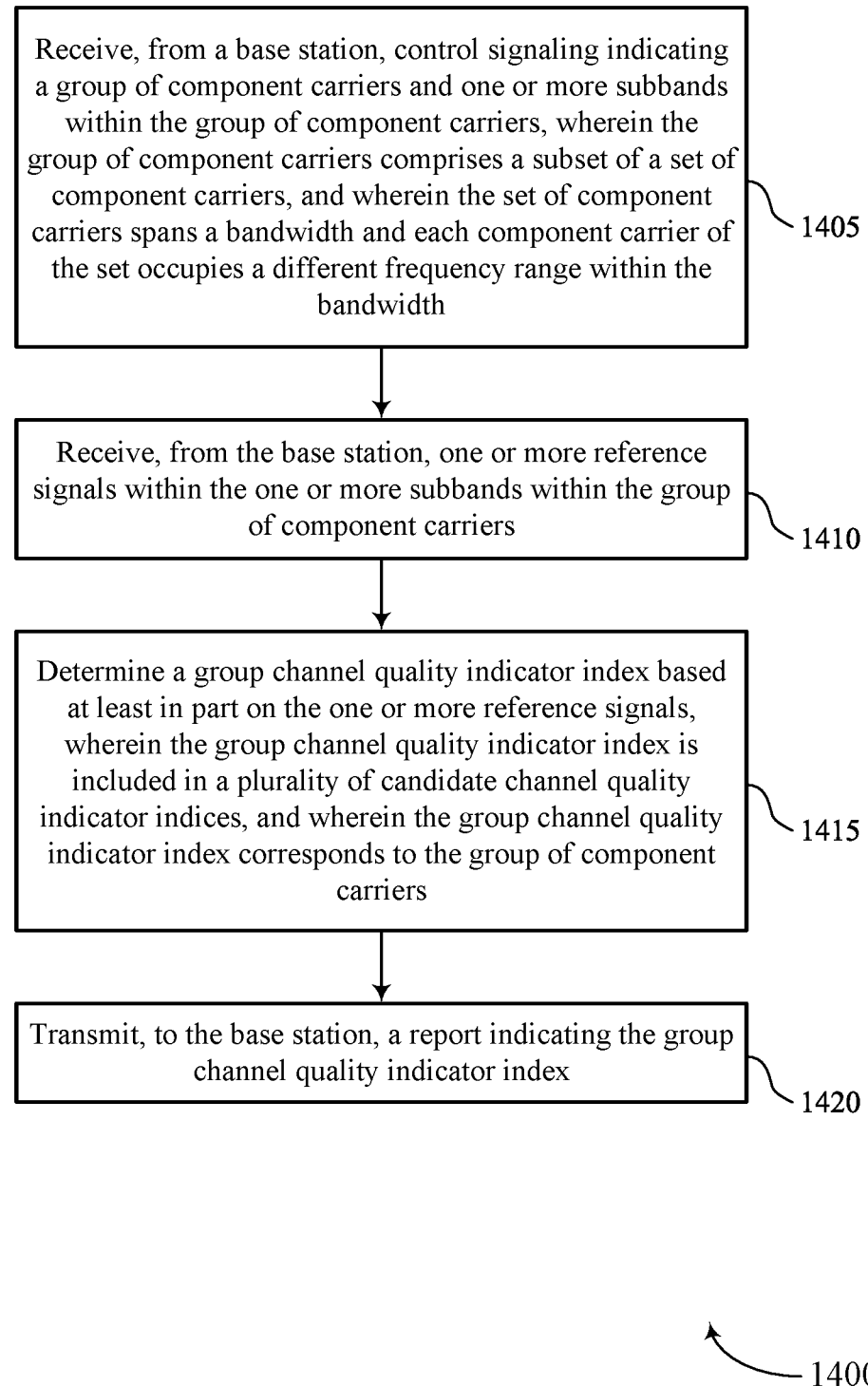
FIGS. 14 through 19 show flowcharts illustrating methods that support CQI reporting across multiple subbands in accordance with aspects of the present disclosure.

FIG. 14 shows a flowchart illustrating a method 1400 that supports CQI reporting across multiple subbands in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The operations of 1405 may be performed in accordance with examples as disclosed herein. In some examples, aspects of the operations of 1405 may be performed by a UE CC manager 825 as described with reference to FIG. 8.

At 1410, the method may include receiving, from the base station, one or more reference signals within the one or more subbands within the group of CCs. The operations of 1410 may be performed in accordance with examples as disclosed herein. In some examples, aspects of the operations of 1410 may be performed by a UE reference signal component 830 as described with reference to FIG. 8.

At 1415, the method may include determining a group CQI index based on the one or more reference signals, where the group CQI index is included in a set of multiple candidate CQI indices, and where the group CQI index corresponds to the group of CCs. The operations of 1415 may be performed in accordance with examples as disclosed herein. In some examples, aspects of the operations of 1415 may be performed by a UE CQI component 835 as described with reference to FIG. 8.

At 1420, the method may include transmitting, to the base station, a report indicating the group CQI index. The operations of 1420 may be performed in accordance with examples as disclosed herein. In some examples, aspects of the operations of 1420 may be performed by a reporting component 840 as described with reference to FIG. 8.

Figure 15:
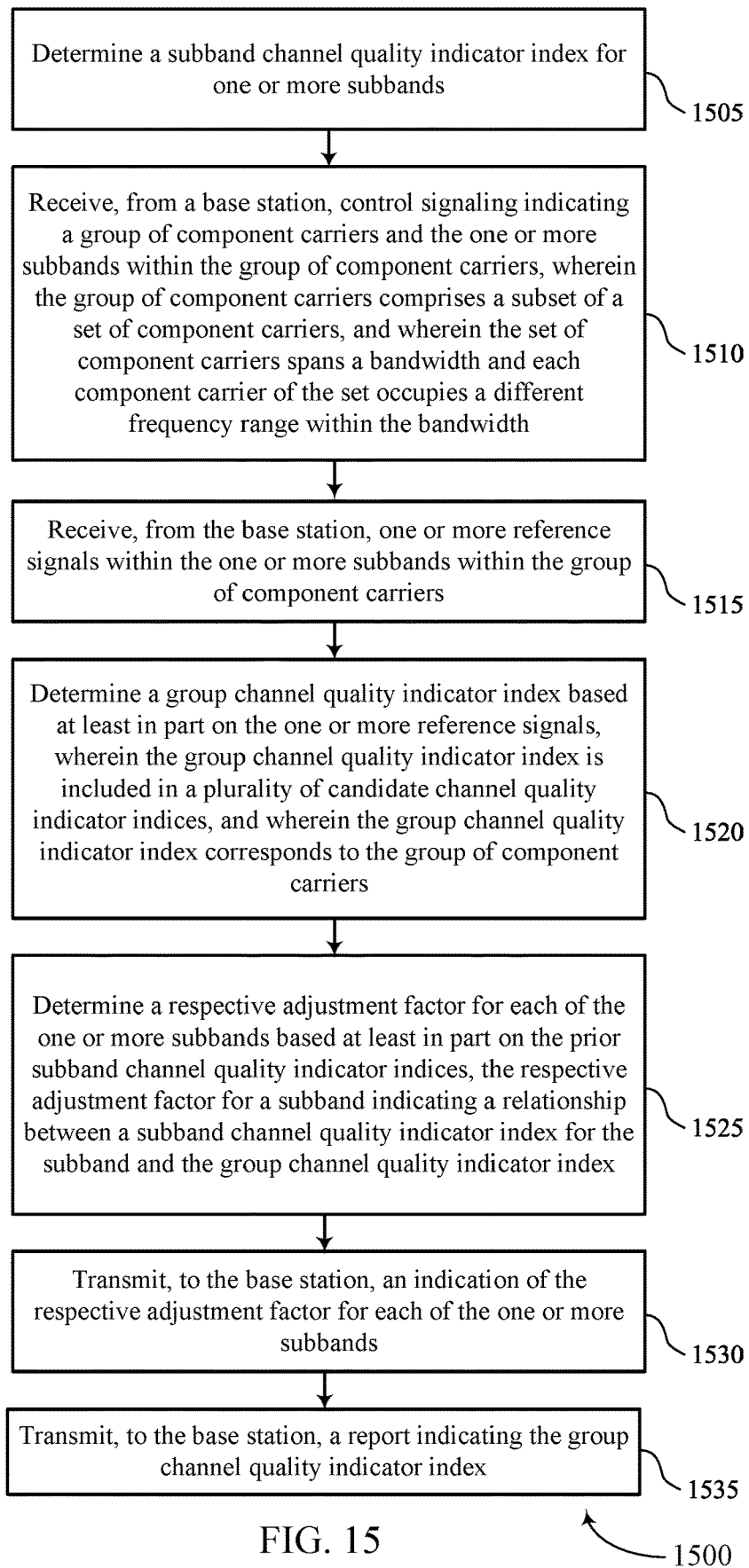

FIG. 15 shows a flowchart illustrating a method 1500 that supports CQI reporting across multiple subbands in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include determining a subband CQI index for one or more subbands. The operations of 1505 may be performed in accordance with examples as disclosed herein. In some examples, aspects of the operations of 1505 may be performed by a UE CQI component 835 as described with reference to FIG. 8.

At 1510, the method may include receiving, from a base station, control signaling indicating a group of CCs and the one or more subbands within the group of CCs, where the group of CCs includes a subset of a set of CCs, and where the set of CCs spans a bandwidth and each CC of the set occupies a different frequency range within the bandwidth. The operations of 1510 may be performed in accordance with examples as disclosed herein. In some examples, aspects of the operations of 1510 may be performed by a UE CC manager 825 as described with reference to FIG. 8.

At 1515, the method may include receiving, from the base station, one or more reference signals within the one or more subbands within the group of CCs. The operations of 1515 may be performed in accordance with examples as disclosed herein. In some examples, aspects of the operations of 1515 may be performed by a UE reference signal component 830 as described with reference to FIG. 8.

At 1520, the method may include determining a group CQI index based on the one or more reference signals, where the group CQI index is included in a set of multiple candidate CQI indices, and where the group CQI index corresponds to the group of CCs. The operations of 1520 may be performed in accordance with examples as disclosed herein. In some examples, aspects of the operations of 1520 may be performed by a UE CQI component 835 as described with reference to FIG. 8.

At 1525, the method may include determining a respective adjustment factor for each of the one or more subbands based on the prior subband CQI indices, the respective adjustment factor for a subband indicating a relationship between a subband CQI index for the subband and the group CQI index. The operations of 1525 may be performed in accordance with examples as disclosed herein. In some examples, aspects of the operations of 1525 may be performed by a UE adjustment component 850 as described with reference to FIG. 8.

At 1530, the method may include transmitting, to the base station, an indication of the respective adjustment factor for each of the one or more subbands. The operations of 1530 may be performed in accordance with examples as disclosed herein. In some examples, aspects of the operations of 1530 may be performed by a UE adjustment component 850 as described with reference to FIG. 8.

At 1535, the method may include transmitting, to the base station, a report indicating the group CQI index. The operations of 1535 may be performed in accordance with examples as disclosed herein. In some examples, aspects of the operations of 1535 may be performed by a reporting component 840 as described with reference to FIG. 8.

Figure 16:
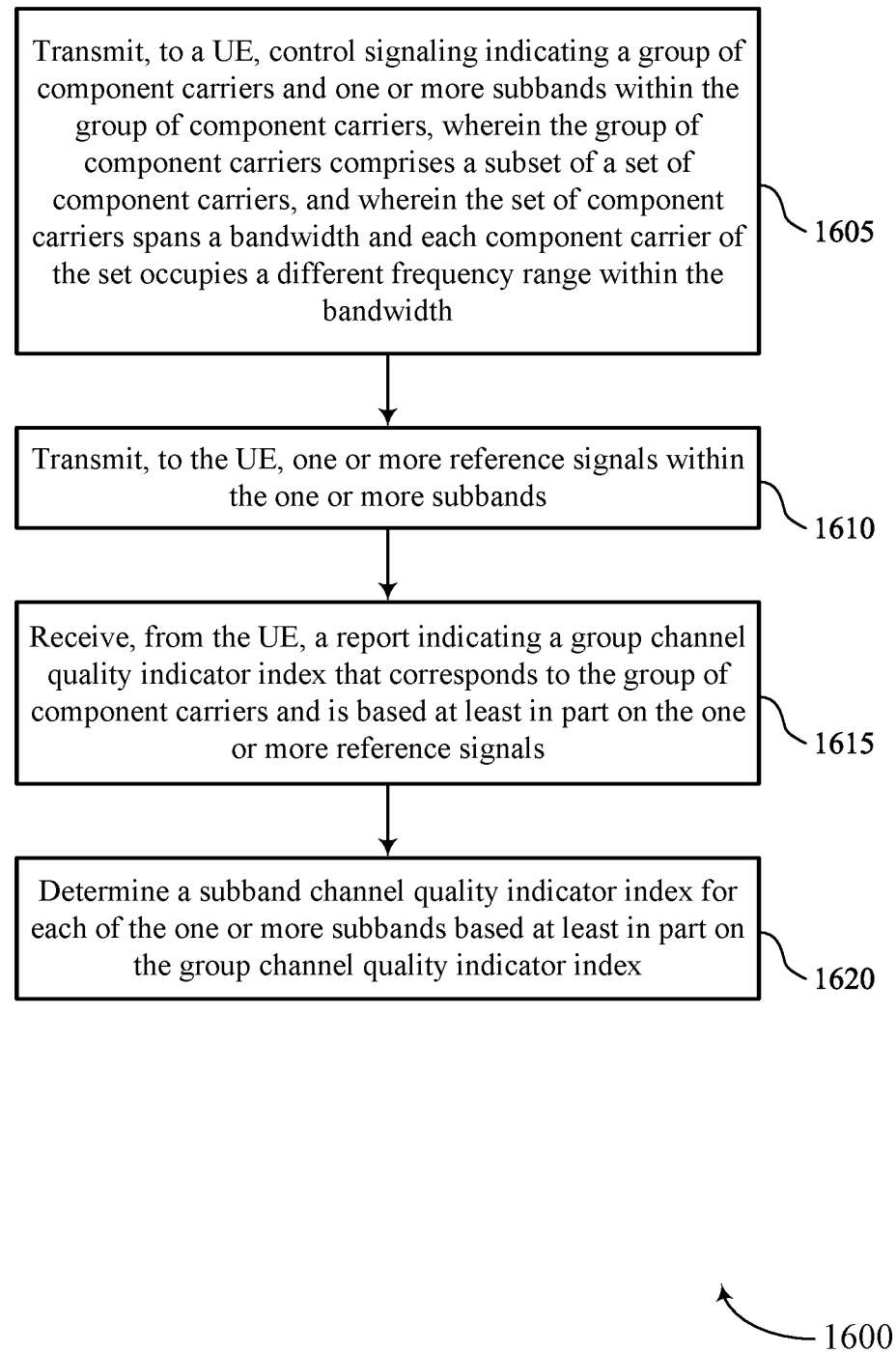

FIG. 16 shows a flowchart illustrating a method 1600 that supports CQI reporting across multiple subbands in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions.

Additionally or alternatively, the base station may perform aspects of the described functions using special-purpose hardware.

At 1605, the method may include transmitting, to a UE, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The operations of 1605 may be performed in accordance with examples as disclosed herein. In some examples, aspects of the operations of 1605 may be performed by a CC manager 1225 as described with reference to FIG. 12.

At 1610, the method may include transmitting, to the UE, one or more reference signals within the one or more subbands. The operations of 1610 may be performed in accordance with examples as disclosed herein. In some examples, aspects of the operations of 1610 may be performed by a reference signal component 1230 as described with reference to FIG. 12.

At 1615, the method may include receiving, from the UE, a report indicating a group CQI index that corresponds to the group of CCs and is based on the one or more reference signals. The operations of 1615 may be performed in accordance with examples as disclosed herein. In some examples, aspects of the operations of 1615 may be performed by a CQI report component 1235 as described with reference to FIG. 12.

At 1620, the method may include determining a subband CQI index for each of the one or more subbands based on the group CQI index. The operations of 1620 may be performed in accordance with examples as disclosed herein. In some examples, aspects of the operations of 1620 may be performed by a CQI component 1240 as described with reference to FIG. 12.

Figure 17:
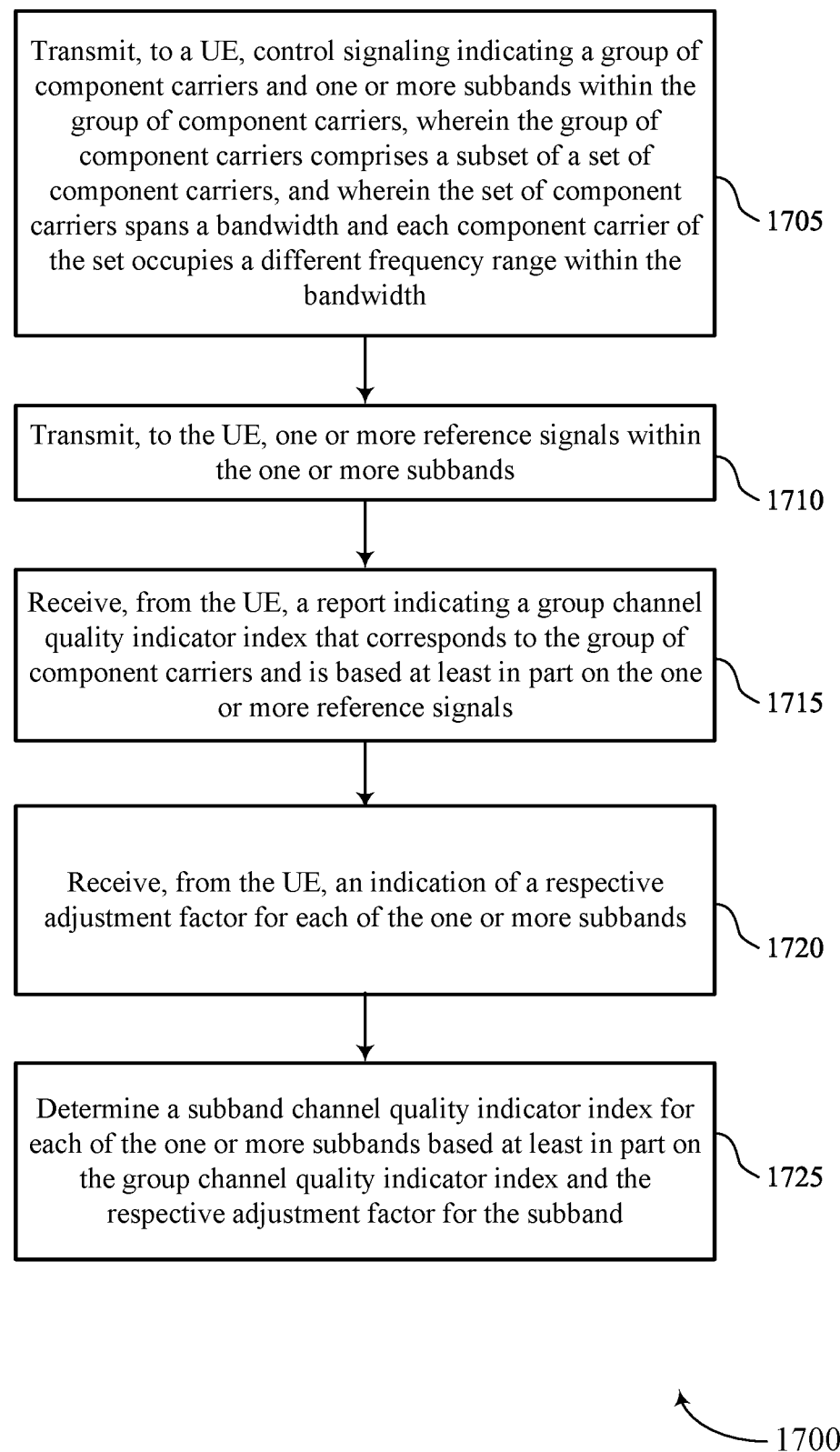

FIG. 17 shows a flowchart illustrating a method 1700 that supports CQI reporting across multiple subbands in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, control signaling indicating a group of CCs and one or more subbands within the group of CCs, where the group of CCs includes a subset of a set of CCs, and where the set of CCs spans a bandwidth and each CC of the set occupies a different frequency range within the bandwidth. The operations of 1705 may be performed in accordance with examples as disclosed herein. In some examples, aspects of the operations of 1705 may be performed by a CC manager 1225 as described with reference to FIG. 12.

At 1710, the method may include transmitting, to the UE, one or more reference signals within the one or more subbands. The operations of 1710 may be performed in accordance with examples as disclosed herein. In some examples, aspects of the operations of 1710 may be performed by a reference signal component 1230 as described with reference to FIG. 12.

At 1715, the method may include receiving, from the UE, a report indicating a group CQI index that corresponds to the group of CCs and is based on the one or more reference signals. The operations of 1715 may be performed in accordance with examples as disclosed herein. In some examples, aspects of the operations of 1715 may be performed by a CQI report component 1235 as described with reference to FIG. 12.

At 1720, the method may include receiving, from the UE, an indication of a respective adjustment factor for each of the one or more subbands. The operations of 1720 may be performed in accordance with examples as disclosed herein. In some examples, aspects of the operations of 1720 may be performed by an adjustment component 1250 as described with reference to FIG. 12.

At 1725, the method may include determining a subband CQI index for each of the one or more subbands based on the group CQI index and the respective adjustment factor for the subband. The operations of 1725 may be performed in accordance with examples as disclosed herein. In some examples, aspects of the operations of 1725 may be performed by a CQI component 1240 as described with reference to FIG. 12.

Figure 18:
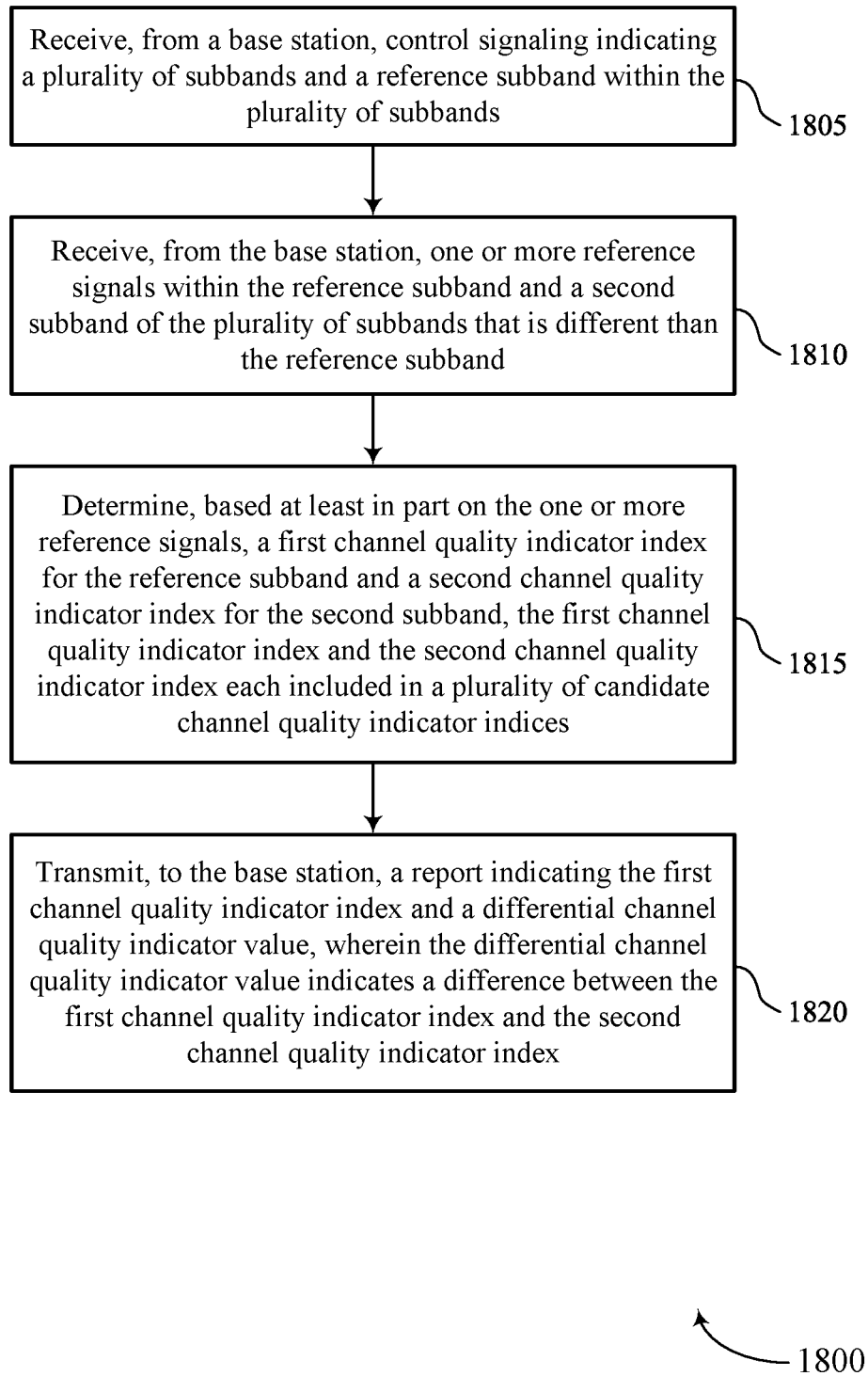

FIG. 18 shows a flowchart illustrating a method 1800 that supports CQI reporting across multiple subbands in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, control signaling indicating a set of multiple subbands and a reference subband within the set of multiple subbands. The operations of 1805 may be performed in accordance with examples as disclosed herein. In some examples, aspects of the operations of 1805 may be performed by a UE subband manager 845 as described with reference to FIG. 8.

At 1810, the method may include receiving, from the base station, one or more reference signals within the reference subband and a second subband of the set of multiple subbands that is different than the reference subband. The operations of 1810 may be performed in accordance with examples as disclosed herein. In some examples, aspects of the operations of 1810 may be performed by a UE reference signal component 830 as described with reference to FIG. 8.

At 1815, the method may include determining, based on the one or more reference signals, a first CQI index for the reference subband and a second CQI index for the second subband, the first CQI index and the second CQI index each included in a set of multiple candidate CQI indices. The operations of 1815 may be performed in accordance with examples as disclosed herein. In some examples, aspects of the operations of 1815 may be performed by a UE CQI component 835 as described with reference to FIG. 8.

At 1820, the method may include transmitting, to the base station, a report indicating the first CQI index and a differential CQI value, where the differential CQI value indicates a difference between the first CQI index and the second CQI index. The operations of 1820 may be performed in accordance with examples as disclosed herein. In some examples, aspects of the operations of 1820 may be performed by a reporting component 840 as described with reference to FIG. 8.

Figure 19:
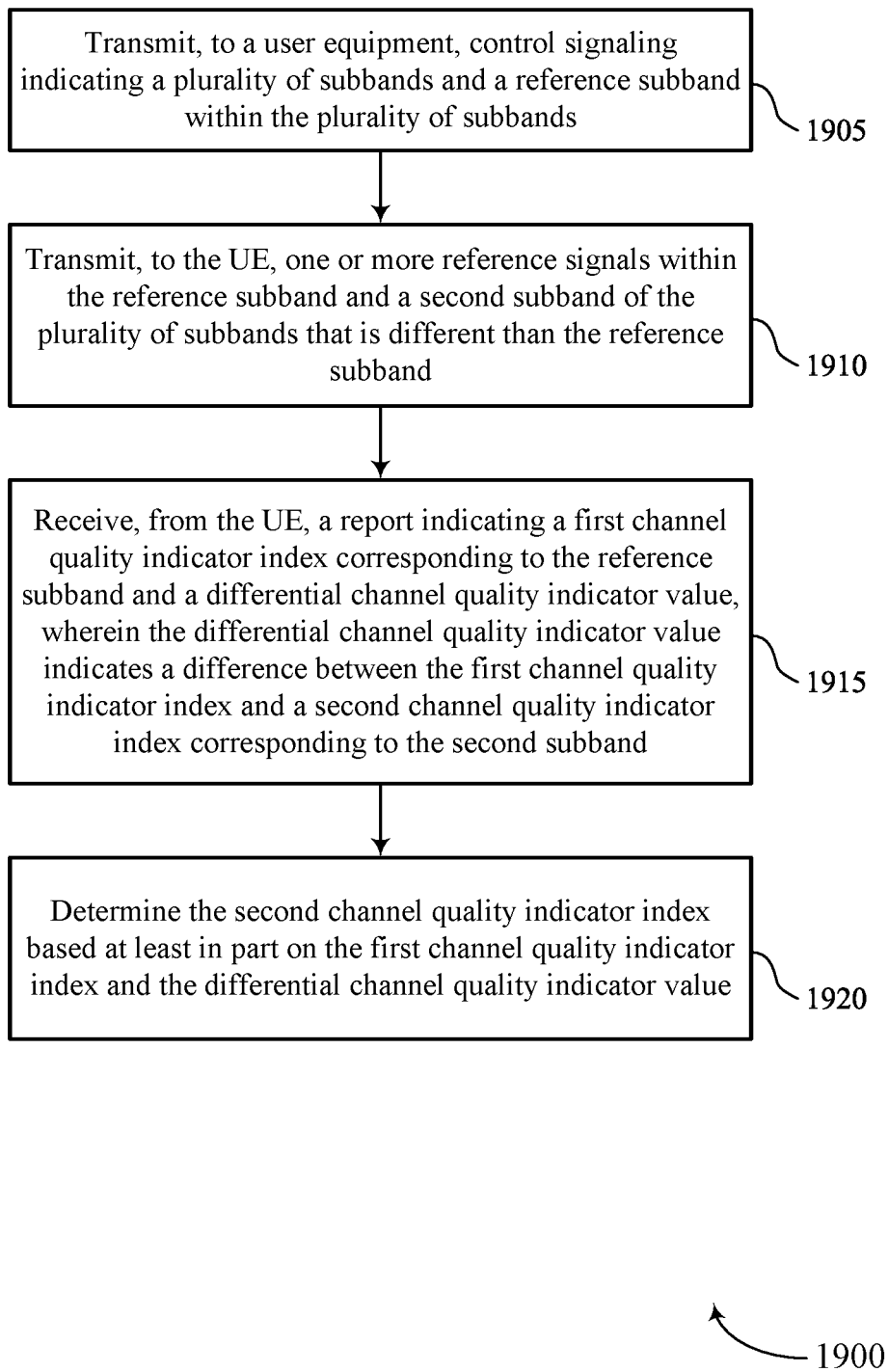

FIG. 19 shows a flowchart illustrating a method 1900 that supports CQI reporting across multiple subbands in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting, to a user equipment, control signaling indicating a set of multiple subbands and a reference subband within the set of multiple subbands. The operations of 1905 may be performed in accordance with examples as disclosed herein. In some examples, aspects of the operations of 1905 may be performed by a subband manager 1245 as described with reference to FIG. 12.

At 1910, the method may include transmitting, to the UE, one or more reference signals within the reference subband and a second subband of the set of multiple subbands that is different than the reference subband. The operations of 1910 may be performed in accordance with examples as disclosed herein. In some examples, aspects of the operations of 1910 may be performed by a reference signal component 1230 as described with reference to FIG. 12.

At 1915, the method may include receiving, from the UE, a report indicating a first CQI index corresponding to the reference subband and a differential CQI value, where the differential CQI value indicates a difference between the first CQI index and a second CQI index corresponding to the second subband. The operations of 1915 may be performed in accordance with examples as disclosed herein. In some examples, aspects of the operations of 1915 may be performed by a CQI report component 1235 as described with reference to FIG. 12.

At 1920, the method may include determining the second CQI index based on the first CQI index and the differential CQI value. The operations of 1920 may be performed in accordance with examples as disclosed herein. In some examples, aspects of the operations of 1920 may be performed by a CQI component 1240 as described with reference to FIG. 12.

The following provides an overview of aspects of the present disclosure:

Aspect 1: A method for wireless communications at a UE, comprising: receiving, from a base station, control signaling indicating a group of CCs and one or more subbands within the group of CCs, wherein the group of CCs comprises a subset of a set of CCs, and wherein the set of CCs spans a bandwidth and each CC of the set occupies a different frequency range within the bandwidth; receiving, from the base station, one or more reference signals within the one or more subbands within the group of CCs; determining a group CQI index based at least in part on the one or more reference signals, wherein the group CQI index is included in a plurality of candidate CQI indices, and wherein the group CQI index corresponds to the group of CCs; and transmitting, to the base station, a report indicating the group CQI index.

Aspect 2: The method of aspect 1, further comprising: determining, before determining the group CQI index, a prior subband CQI index for each of the one or more subbands; determining a respective adjustment factor for each of the one or more subbands based at least in part on the prior subband CQI indices, the respective adjustment factor for a subband indicating a relationship between a subband CQI index for the subband and the group CQI index; and transmitting, to the base station, an indication of the respective adjustment factor for each of the one or more subbands.

Aspect 3: The method of any of aspects 1 and 2, further comprising: receiving, from the base station, control signaling indicating a second group of CCs, the second group of CCs comprising at least one CC of the group of CCs, wherein at least one of the one or more subbands is located within the second group of CCs.

Aspect 4: The method of aspect 3, further comprising: determining a second group CQI index based at least in part on one or more reference signals within the second group of CCs, wherein the second group CQI index is included in the plurality of candidate CQI indices, and wherein the second group CQI index corresponds to the second group of CCs; and transmitting, to the base station, a report indicating the second group CQI index.

Aspect 5: The method of any of aspects 1 through 4, further comprising: receiving, from the base station, control signaling indicating a virtual CC, the virtual CC comprising two or more subbands within two or more CCs of the group of CCs; and transmitting at least one of a wideband CQI report corresponding to the bandwidth, a subband CQI report, or both corresponding to the virtual CC.

Aspect 6: The method of any of aspects 1 through 5, further comprising: transmitting, to the base station, a CC group recommendation, wherein the CC group recommendation comprises an indication of a second group of CCs, and wherein receiving the control signaling indicating the group of CCs is based at least in part on the CC group recommendation.

Aspect 7: The method of any of aspects 1 through 6, wherein receiving the control signaling indicating the group of CCs and the one or more subbands comprises: receiving RRC signaling that indicates the group of CCs and the one or more subbands.

Aspect 8: The method of any of aspects 1 through 7, wherein the group of CCs comprises CCs that are non-contiguous in frequency.

Aspect 9: The method of any of aspects 1 through 7, wherein the group of CCs comprises CCs that are contiguous in frequency.

Aspect 10: A method of wireless communications at a base station, comprising: transmitting, to a UE, control signaling indicating a group of CCs and one or more subbands within the group of CCs, wherein the group of CCs comprises a subset of a set of CCs, and wherein the set of CCs spans a bandwidth and each CC of the set occupies a different frequency range within the bandwidth; transmitting, to the UE, one or more reference signals within the one or more subbands; receiving, from the UE, a report indicating a group CQI index that corresponds to the group of CCs and is based at least in part on the one or more reference signals; and determining a subband CQI index for each of the one or more subbands based at least in part on the group CQI index.

Aspect 11: The method of aspect 10, further comprising: receiving, from the UE, an indication of a respective adjustment factor for each of the one or more subbands, wherein determining the subband CQI index for a subband of the one or more subbands is based at least in part on the group CQI index and the respective adjustment factor for the subband.

Aspect 12: The method of any of aspects 10 through 11, further comprising: transmitting, to the UE, control signaling indicating a second group of CCs, the second group of CCs comprising at least one CC of the group of CCs, wherein at least one subband of the one or more subbands is located within the second group of CCs.

Aspect 13: The method of aspect 12, further comprising: receiving, from the UE, a report indicating a second group CQI index that corresponds to the second group of CCs and is based at least in part on one or more reference signals within the second group of CCs, wherein determining the subband CQI index for the at least one subband is based at least in part on the group CQI index and the second group CQI index.

Aspect 14: The method of any of aspects 10 through 13, further comprising: transmitting, to the UE, control signaling indicating a virtual CC, the virtual CC comprising two or more subbands within two or more CCs of the set of CCs; and receiving at least one of a wideband CQI report corresponding to the bandwidth, a subband CQI report, or both corresponding to the virtual CC.

Aspect 15: The method of any of aspects 10 through 14, further comprising: receiving, from the UE, a CC group recommendation, wherein the CC group recommendation comprises an indication of a second group of CCs, and wherein transmitting the control signaling indicating the group of CCs is based at least in part on the CC group recommendation.

Aspect 16: The method of any of aspects 10 through 15, wherein transmitting the control signaling indicating the group of CCs and the one or more subbands comprises: transmitting RRC signaling that indicates the group of CCs and the one or more subbands.

Aspect 17: The method of any of aspects 10 through 16, wherein the group of CCs comprises CCs that are non-contiguous in frequency.

Aspect 18: The method of any of aspects 10 through 16, wherein the group of CCs comprises CCs that are contiguous in frequency.

Aspect 19: A method of wireless communications at a UE, comprising: receiving, from a base station, control signaling indicating a plurality of subbands and a reference subband within the plurality of subbands; receiving, from the base station, one or more reference signals within the reference subband and a second subband of the plurality of subbands that is different than the reference subband; determining, based at least in part on the one or more reference signals, a first CQI index for the reference subband and a second CQI index for the second subband, the first CQI index and the second CQI index each included in a plurality of candidate CQI indices; and transmitting, to the base station, a report indicating the first CQI index and a differential CQI value, wherein the differential CQI value indicates a difference between the first CQI index and the second CQI index.

Aspect 20: The method of aspect 19, further comprising: receiving, from the base station, an indication of a mapping between the reference subband and a CC of a set of CCs, wherein the reference subband is located within the CC.

Aspect 21: The method of aspect 19, further comprising, receiving, from the base station, an indication of a mapping between the reference subband and at least two CCs of a set of CCs, wherein the reference subband is located within a CC of the at least two CCs Aspect 22: The method of any of aspects 19 through 21, further comprising: receiving, from the base station and after transmitting the report, control signaling indicating a second reference subband within the plurality of subbands, the second reference subband different than the reference subband.

Aspect 23: The method of any of aspects 19 through 22, further comprising: determining a third CQI index for a third subband of the plurality of subbands, the third subband different than the reference subband and the second subband, wherein the report indicates a second differential CQI indicating the difference between the first CQI index and the third CQI index.

Aspect 24: The method of any of aspects 19 through 23, further comprising: exchanging, with the base station, an indication of a quantity of bits included in an indication of the differential CQI value.

Aspect 25: A method of wireless communication at a base station, comprising: transmitting, to a user equipment, control signaling indicating a plurality of subbands and a reference subband within the plurality of subbands; transmitting, to the UE, one or more reference signals within the reference subband and a second subband of the plurality of subbands that is different than the reference subband; receiving, from the UE, a report indicating a first CQI index corresponding to the reference subband and a differential CQI value, wherein the differential CQI value indicates a difference between the first CQI index and a second CQI index corresponding to the second subband; and determining the second CQI index based at least in part on the first CQI index and the differential CQI value.

Aspect 26: The method of aspect 25, further comprising: transmitting, to the UE, an indication of a mapping between the reference subband and a CC of a set of CCs, wherein the subband is located within the CC.

Aspect 27: The method of aspect 25, further comprising, transmitting, to the UE, an indication of a mapping between the reference subband and at least two CCs of a set of CCs, wherein the subband is located within a CC of the at least two CCs Aspect 28: The method of any of aspects 25 through 27, further comprising: transmitting, to the UE and after receiving the report, control signaling indicating a second reference subband within the plurality of subbands, the second reference subband different than the reference subband.

Aspect 29: The method of any of aspects 25 through 28, further comprising: receiving, from the UE, the report indicating a second differential CQI value, wherein the second differential CQI value indicates a difference between the first CQI index and a third CQI index corresponding to a third subband; and determining the third CQI index based at least in part on the first CQI index and the second differential CQI value.

Aspect 30: The method of any of aspects 25 through 29, further comprising: exchanging, with the UE, an indication of a quantity of bits included in an indication of the differential CQI value.

Aspect 31: An apparatus for wireless communications at a UE, comprising a processor; memory coupled with the processor; and instructions stored in the memory and executable by the processor to cause the apparatus to perform a method of any of aspects 1 through 9.

Aspect 32: An apparatus for wireless communications at a UE, comprising at least one means for performing a method of any of aspects 1 through 9.

Aspect 33: A non-transitory computer-readable medium storing code for wireless communications at a UE, the code comprising instructions executable by a processor to perform a method of any of aspects 1 through 9.

Aspect 34: An apparatus comprising a processor; memory coupled with the processor; and instructions stored in the memory and executable by the processor to cause the apparatus to perform a method of any of aspects 10 through 18.

Aspect 35: An apparatus comprising at least one means for performing a method of any of aspects 10 through 18.

Aspect 36: A non-transitory computer-readable medium storing code the code comprising instructions executable by a processor to perform a method of any of aspects 10 through 18.

Aspect 37: An apparatus comprising a processor; memory coupled with the processor; and instructions stored in the memory and executable by the processor to cause the apparatus to perform a method of any of aspects 19 through 24.

Aspect 38: An apparatus comprising at least one means for performing a method of any of aspects 19 through 24.

Aspect 39: A non-transitory computer-readable medium storing code the code comprising instructions executable by a processor to perform a method of any of aspects 19 through 24.

Aspect 40: An apparatus comprising a processor; memory coupled with the processor; and instructions stored in the memory and executable by the processor to cause the apparatus to perform a method of any of aspects 25 through 30.

Aspect 41: An apparatus comprising at least one means for performing a method of any of aspects 25 through 30.

Aspect 42: A non-transitory computer-readable medium storing code the code comprising instructions executable by a processor to perform a method of any of aspects 25 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software (e.g., executed by a processor), or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), or otherwise ascertaining. Also, "determining" can include receiving (such as receiving information) or accessing (such as accessing data in a memory). Also, "determining" can include resolving, selecting, choosing, or establishing.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving control signaling indicating a virtual component carrier, the virtual component carrier comprising two or more subbands within two or more component carriers of a set of component carriers, wherein the set of component carriers spans a bandwidth and each component carrier of the set of component carriers occupies a different frequency range within the bandwidth;
   receiving control signaling indicating one or more groups of component carriers, wherein each group of the one or more groups of component carriers comprises a subset of the set of component carriers;
   receiving one or more reference signals within at least one of the two or more subbands;
   transmitting a component carrier group recommendation, wherein the component carrier group recommendation comprises an indication of a group of component carriers, and wherein receiving the control signaling indicating the one or more groups of component carriers is based at least in part on the component carrier group recommendation; and
   transmitting, based at least in part on the one or more reference signals, a wideband channel quality indicator report, a subband channel quality report, or both corresponding to the virtual component carrier.

2. The method of claim 1, further comprising:
   receiving control signaling indicating a set of subbands, wherein the set of subbands comprises at least one of the two or more subbands.

3. The method of claim 1, wherein a group of component carriers of the one or more groups of component carriers comprises the two or more component carriers.

4. The method of claim 3, further comprising:
   determining, based at least in part on the one or more reference signals, a group channel quality index corresponding to the group of component carriers; and
   transmitting a report indicating the group channel quality index.

5. The method of claim 4, further comprising:
   transmitting signaling indicating a respective adjustment factor for each of the two or more subbands, the respective adjustment factor for a subband indicating a relationship between a subband quality index for the subband and the group channel quality index.

6. The method of claim 1, wherein receiving the control signaling indicating the one or more groups of component carriers comprises:
   receiving radio resource control signaling that indicates the one or more groups of component carriers.

7. The method of claim 1, wherein the two or more component carriers comprises component carriers that are non-contiguous in frequency.

8. The method of claim 1, wherein the two or more component carriers comprises component carriers that are contiguous in frequency.

9. A method of wireless communications at a network device, comprising:
   transmitting control signaling indicating a virtual component carrier, the virtual component carrier comprising two or more subbands within two or more component carriers of a set of component carriers, wherein the set of component carriers spans a bandwidth and each component carrier of the set of component carriers occupies a different frequency range within the bandwidth;
   transmitting control signaling indicating one or more groups of component carriers, wherein each group of the one or more groups of component carriers comprises a subset of the set of component carriers;
   transmitting one or more reference signals within at least one subband of the two or more subbands;
   receiving a component carrier group recommendation, wherein the component carrier group recommendation comprises an indication of a group of component carriers, and wherein transmitting the control signaling indicating the one or more groups of component carriers is based at least in part on the component carrier group recommendation; and receiving, based at least in part on the one or more reference signals, a wideband channel quality report, a subband channel quality report, or both corresponding to the virtual component carrier.

10. The method of claim 9, further comprising:
transmitting control signaling indicating a set of subbands, wherein the set of subbands comprises at least one of the two or more subbands.

11. The method of claim 9, wherein a group of component carriers of the one or more groups of component carriers comprises the two or more component carriers.

12. The method of claim 9, wherein transmitting the control signaling indicating the one or more groups of component carriers comprises:
transmitting radio resource control signaling that indicates the one or more groups of component carriers.

13. The method of claim 9, wherein the virtual component carrier comprises component carriers that are non-contiguous in frequency.

14. The method of claim 9, wherein the virtual component carrier comprises component carriers that are contiguous in frequency.

15. A method of wireless communications at a user equipment (UE), comprising:
receiving control signaling indicating a reference subband within a plurality of subbands, the control signaling further indicating one or more groups of component carriers, wherein each group of the one or more groups of component carriers comprises a subset of a set of component carriers;
receiving one or more reference signals using the reference subband and a second subband within the plurality of subbands;
transmitting a component carrier group recommendation, wherein the component carrier group recommendation comprises an indication of a group of component carriers, and wherein receiving the control signaling indicating the one or more groups of component carriers is based at least in part on the component carrier group recommendation; and
transmitting a report indicating a first channel quality indicator index associated with the reference subband and a differential channel quality indicator that is based at least in part on a difference between the first channel quality indicator index and a second channel quality indicator index associated with the second subband, wherein the first channel quality indicator index and the second channel quality indicator index are based at least in part on the one or more reference signals.

16. The method of claim 15, wherein receiving the control signaling comprises:
receiving signaling indicating of a mapping between the reference subband and one or more component carriers of the set of component carriers, wherein the reference subband is located within a component carrier of the one or more component carriers.

17. The method of claim 15, wherein receiving the control signaling comprises:
receiving signaling indicating a mapping between the reference subband and the second subband within the plurality of subbands, the second subband different than the reference subband.

18. The method of claim 15, further comprising:
receiving, after transmitting the report, control signaling indicating a second reference subband within the plurality of subbands, the second reference subband different than the reference subband.

19. The method of claim 15, further comprising:
determining a third channel quality indicator index for a third subband of the plurality of subbands, the third subband different than the reference subband and the second subband, wherein the report indicates a second differential channel quality indicator indicating the difference between the first channel quality indicator index and the third channel quality indicator index.

20. A method of wireless communication at a network device, comprising:
transmitting control signaling indicating a reference subband within a plurality of subbands, the control signaling further indicating one or more groups of component carriers, wherein each group of the one or more groups of component carriers comprises a subset of a set of component carriers;
transmitting one or more reference signals using the reference subband and a second subband within the plurality of subbands;
receiving a component carrier group recommendation, wherein the component carrier group recommendation comprises an indication of a group of component carriers, and wherein transmitting the control signaling indicating the one or more groups of component carriers is based at least in part on the component carrier group recommendation; and
receiving a report indicating a first channel quality indicator index associated with the reference subband and a differential channel quality indicator value that is based at least in part on a difference between the first channel quality indicator index and a second channel quality indicator index associated with the second subband, wherein the first channel quality indicator index and the second channel quality indicator index are based at least in part on the one or more reference signals.

21. The method of claim 20, wherein transmitting the control signaling comprises:
transmitting signaling indicating a mapping between the reference subband and one or more component carriers of the set of component carriers, wherein the reference subband is located within a component carrier of the one or more component carriers.

22. The method of claim 20, wherein transmitting the control signaling comprises:
transmitting signaling indicating a mapping between the reference subband and the second subband within the plurality of subbands, the second subband different than the reference subband.

23. The method of claim 20, further comprising:
transmitting, after receiving the report, control signaling indicating a second reference subband within the plurality of subbands, the second reference subband different than the reference subband.

24. The method of claim 20, further comprising:
receiving the report indicating a second differential channel quality indicator value, wherein the second differential channel quality indicator value indicates a difference between the first channel quality indicator index and a third channel quality indicator index corresponding to a third subband; and
determining the third channel quality indicator index based at least in part on the first channel quality indicator index and the second differential channel quality indicator value.

* * * * *